(12) United States Patent
Fourcand et al.

(10) Patent No.: US 6,731,741 B1
(45) Date of Patent: May 4, 2004

(54) SIGNALING SERVER FOR PROCESSING SIGNALING INFORMATION IN A TELECOMMUNICATIONS NETWORK

(75) Inventors: Serge F. Fourcand, Fairview, TX (US); Gerry R. Dubois, Lucas, TX (US); Gary D. Hanson, Plano, TX (US); Dwight W. Doss, Richardson, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/539,917

(22) Filed: Mar. 31, 2000

(51) Int. Cl.[7] .................................................. H04M 7/00
(52) U.S. Cl. .................... 379/221.08; 379/230; 379/900
(58) Field of Search ............................... 370/395.3, 385, 370/467, 352, 353, 354, 355, 356; 379/88.17, 221.08, 221.09, 221.1, 221.13, 230, 900

(56) References Cited

U.S. PATENT DOCUMENTS 6,324,183 B1 * 11/2001 Miller et al. ................ 370/467
6,483,837 B1 * 11/2002 Howell et al. ......... 370/395.03
6,529,524 B1 * 3/2003 Liao et al. .................. 370/467
6,535,599 B1 * 3/2003 Torrey et al. .......... 379/221.13

* cited by examiner

*Primary Examiner*—Bing Bui
(74) *Attorney, Agent, or Firm*—Baker Botts; Craig A. Hoersten; V. Lawrence Sewell

(57) ABSTRACT

A telecommunications network environment (10) includes a signaling server (20) accessible by maintenance interfaces (12) and network interfaces (14). The signaling server (20) includes a signaling link controller (83) that receives and processes signaling information received from network elements and other signaling servers. The signaling link controller (83) extracts a data portion of the signaling information for message transfer part level two processing. For additional processing, the data portion of the signaling information may be routed over an Ethernet switch (76) to another signaling link controller (83) or to a signaling services controller (99) for signaling connection control part processing. The signaling services control element (99) may perform local number portability lookup and global title translation on the received data portion. After processing, the signaling link controller (83) generates a return message in response to the signaling information.

9 Claims, 23 Drawing Sheets

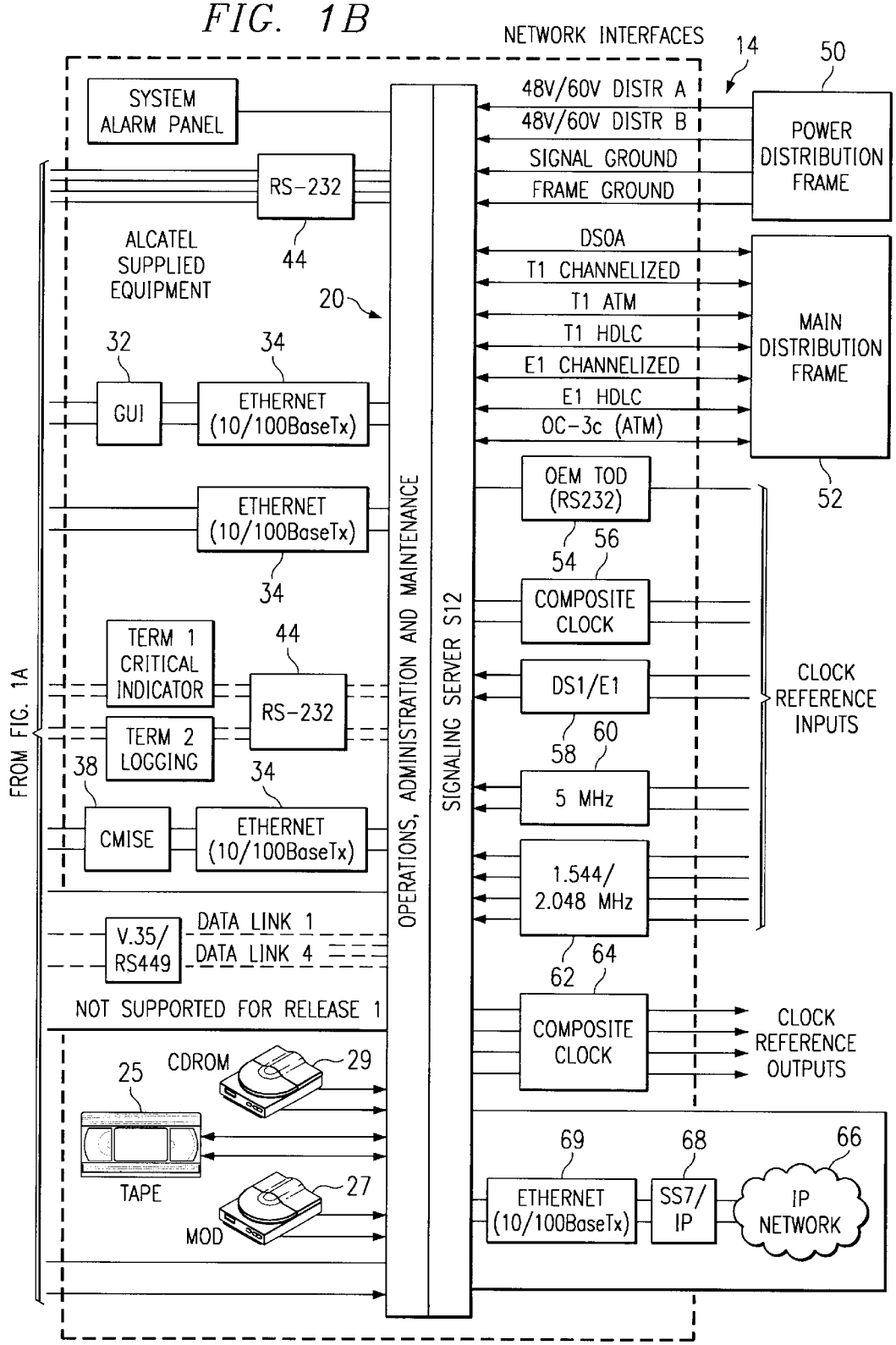

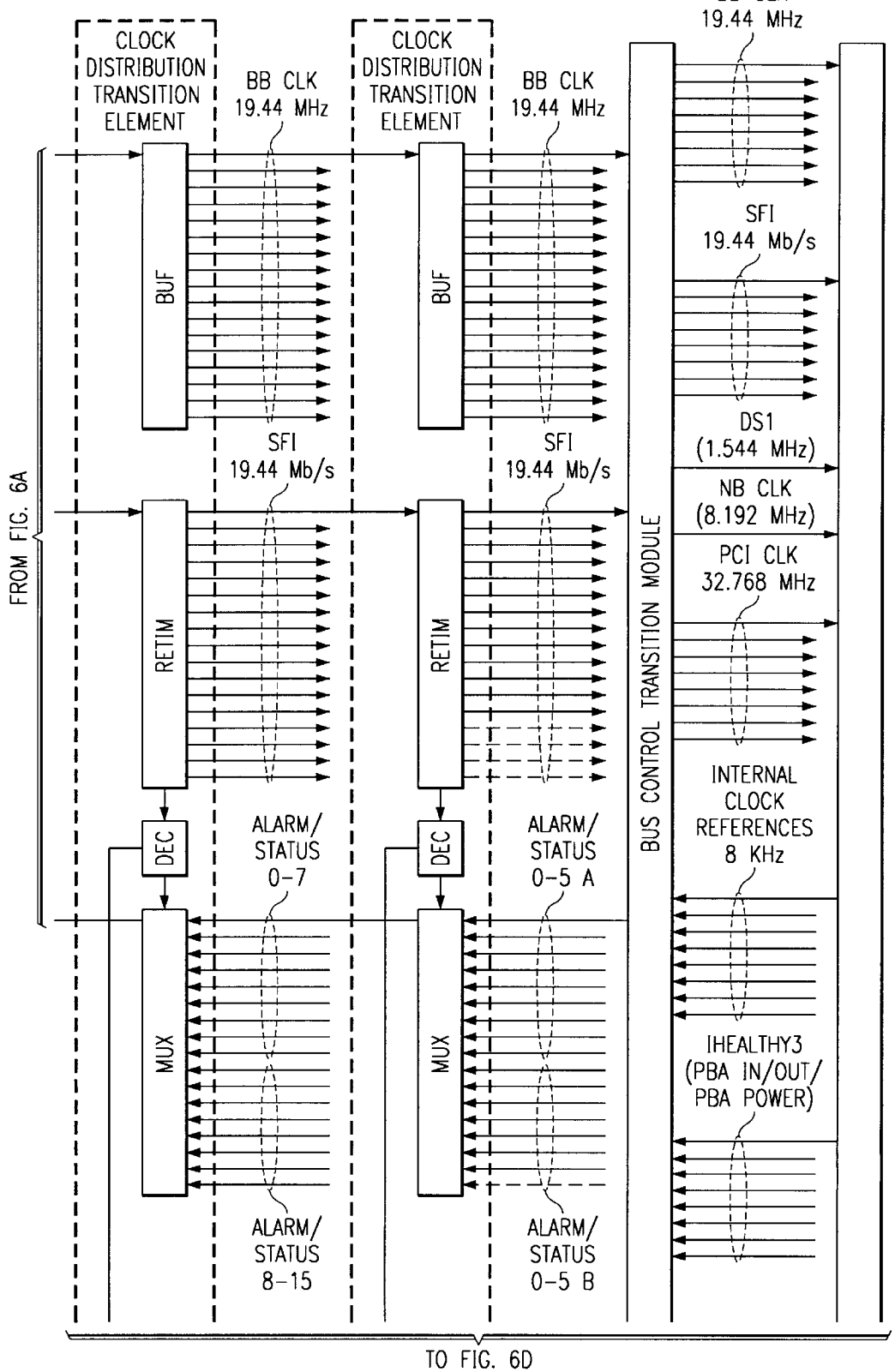

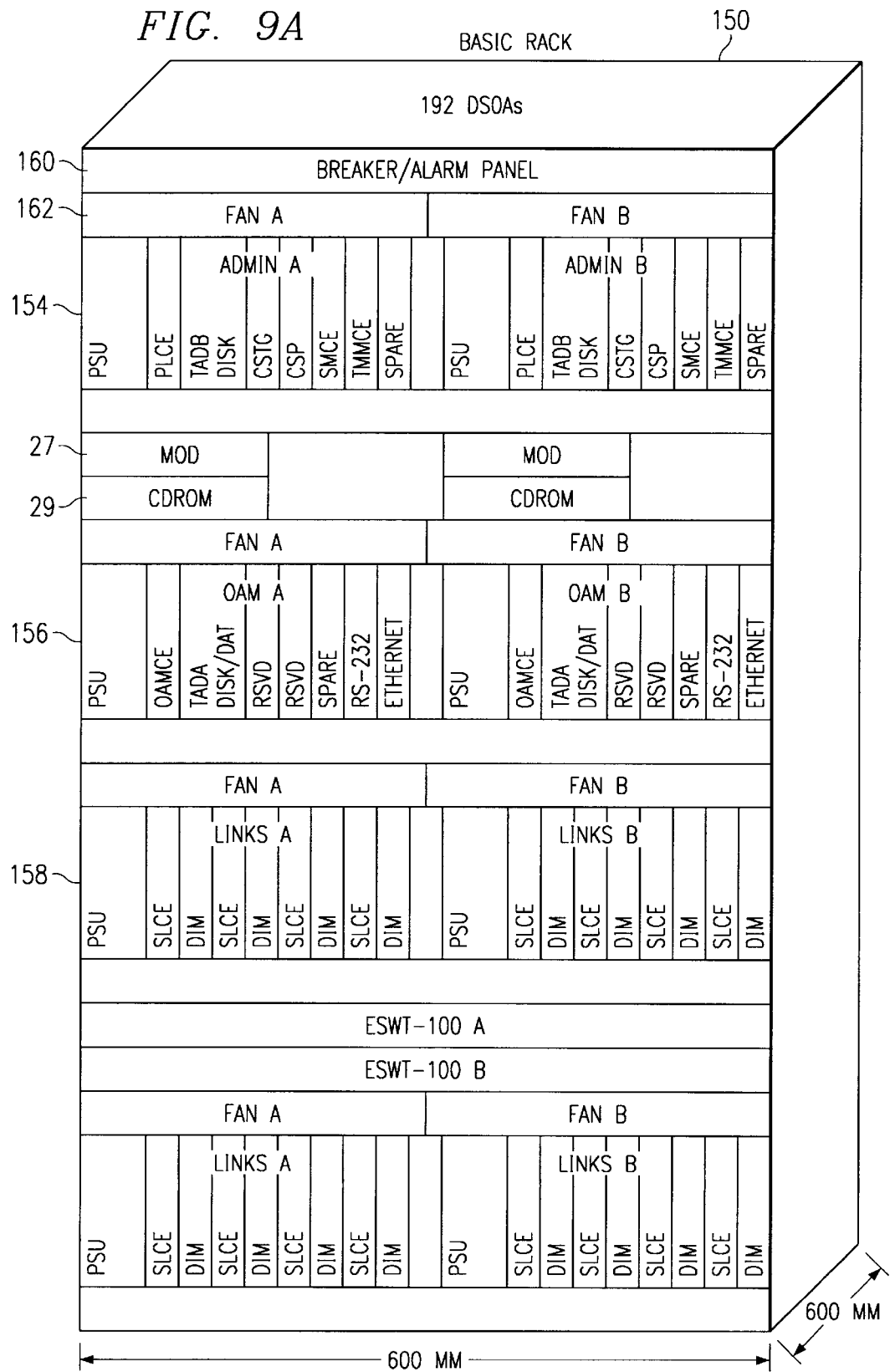

SIGNALING SERVER FOR PROCESSING SIGNALING INFORMATION IN A TELECOMMUNICATIONS NETWORK

TECHNICAL FIELD OF THE INVENTION

The present invention relates in general to telecommunications network processing and more particularly to a signaling server for processing signaling information in a telecommunications network.

BACKGROUND OF THE INVENTION

SS7/C7 packet signaling has become the communication medium of choice between telephony networks and network elements worldwide. These flexible but complex multi-layered ANSI/ITU based protocols have replaced the relatively primitive signaling and switching techniques developed in the early days of telephony. Today, they provide the interface that binds the autonomous networks together to provide a one network transparency that telephone subscribers have come to expect. The exponential increase in the number of local telephone lines, mobile telephone subscribers, pagers, and fax machines coupled with deregulation is driving a demand for small size high capacity signal transfer points (STP). These STPs must be easy to maintain, provide full SS7/C7 functionality, and provide the capability to support future functionality, features, and expansion as the need arises. Further, with the advent of Advanced Intelligent Network (AIN) services, STPs were used in conjunction with SCPs to support such capability. However, to reduce equipment costs, network facility costs, maintenance costs, and network complexity, a single flexible platform is needed to support large database, high transaction AIN services, and high capacity packet switching. Therefore, it is desirable to have a STP that can handle the telephony demands of today and well into the future.

SUMMARY OF THE INVENTION

From the foregoing, it may be appreciated by those skilled in the art that a need has arisen for a flexible and robust signaling server. In accordance with the present invention, a signaling server for processing signaling information in a telecommunications network is provided that substantially eliminates or reduces disadvantages and problems associated with conventional signal transfer points.

According to an embodiment of the present invention, there is provided a signaling server for processing signaling information in a telecommunications network that includes a signaling link controller operable to receive signaling information from a network element. The signaling link controller extracts a data portion from the signaling information and processes the data portion of the signaling message. The signaling link controller generates a return message in response to processing of the data portion of the signaling information. An Ethernet switch is operable to route the data portion for further processing.

The present invention provides various technical advantages over conventional signal transfer points. For example, one technical advantage is to implement an Ethernet routing capability within the signaling server. Another technical advantage is to provide local processing of signaling information. Yet another technical advantage is to provide complete redundancy of operation and efficient selection between active and standby elements. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1A:
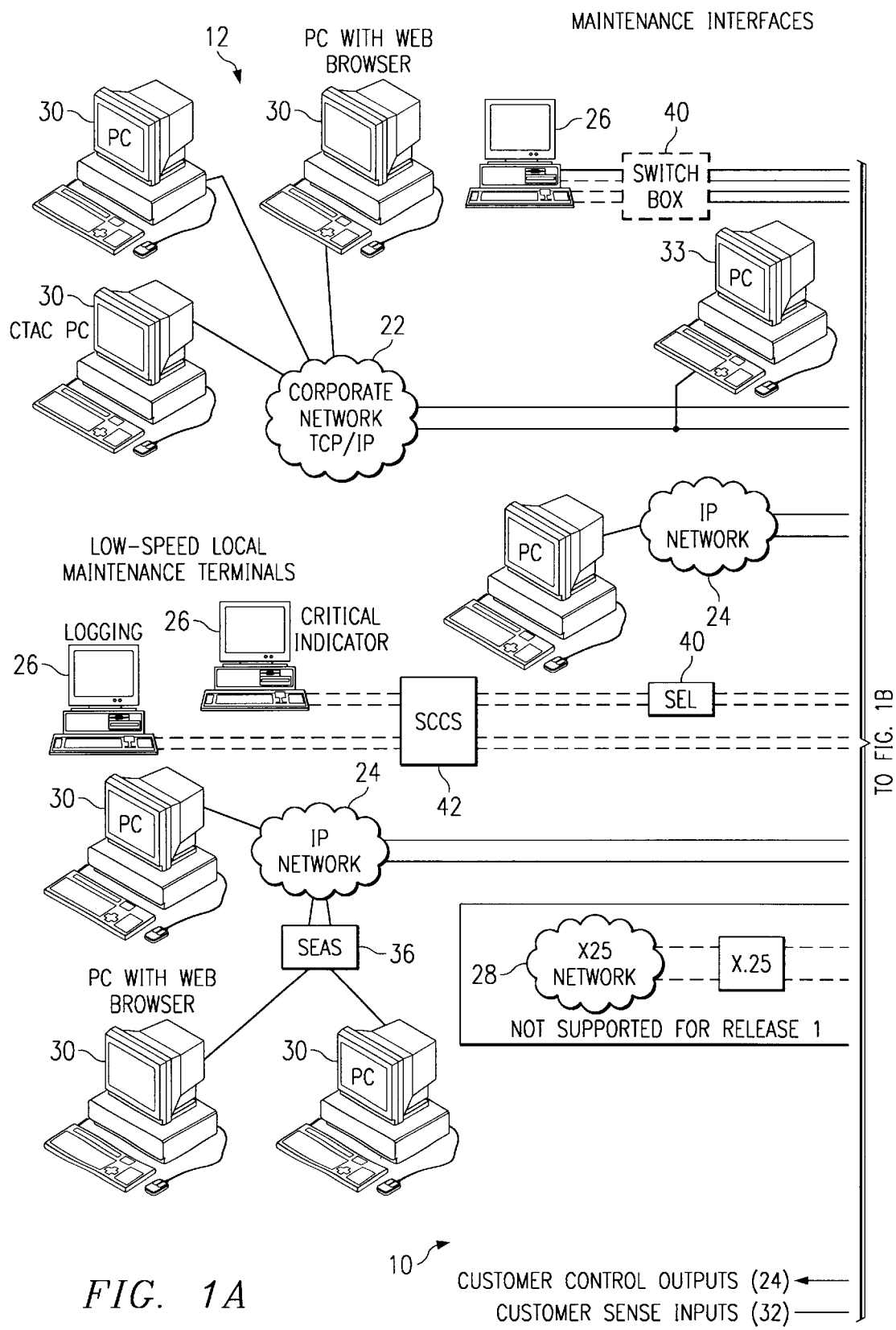
FIG. 1 illustrates a block diagram of a network environment for a signaling server.

FIG. 1 is a block diagram of a network environment 10. Network environment 10 includes maintenance interfaces 12 and network interfaces 14. Maintenance interfaces 12 and network interfaces 14 couple to a signaling server 20.

Maintenance interfaces 12 provide access to signaling server 20 for operations, administration, and maintenance functions. Signaling server 20 may be accessed through various types of interfacing techniques. For example, signaling server 20 may be accessed through a corporate network 22, an Internet Protocol (IP) network 24, or low speed local maintenance terminals 26. Access to signaling server 20 may also be attained through an X.25 network 28. Maintenance information for signaling server 20 may also be provided and stored by tape devices 25, magnetic optical devices (MOD 27, and/or compact disk read only memory (CDROM) devices 29. Signaling server 20 may provide control outputs to customers and receive sense inputs from customers.

Corporate network 22 may provide a communication capability between signaling server 20 and one or more personal computers 30 within the corporation. communication may be achieved through a graphical user interface 32 using any type of communication format to include an Ethernet 34 based communication protocol. Moreover, a standalone corporate computer 33 may be coupled directly to graphical user interface 32 without interfacing through corporate network 22. Internet Protocol network 24 may provide a communication capability between signaling server 20 and one or more personal computers 30 similar to corporate network 22. Personal computers 30 may couple directly to Internet Protocol network 24 or through any of various interfaces such as a Signaling Engineering and Administration system 36. Communication between Internet Protocol network 24 and signaling server 20 may be carried out using a Common Management Information Service 38 through Ethernet 34 or any of various conventional communication techniques. Low speed local maintenance terminals 26 may communicate with signaling server 20 through switches 40 or No. 2 Switching Control center 42 over RS-232 links 44 or any other conventional communication technique. Low speed local maintenance terminals 26 may provide logging and/or critical indicator functions as well as other conventional maintenance features. X.25 network 28 may communicate with signaling server 20 through an X.25 interface 46 and a V.35/RS-449 link 48.

Network interfaces 14 provide network access to signaling server 20. Power requirements for signaling server 20 may be provided by a power distribution frame 50. Power distribution frame 50 supplies primary and secondary distribution power to signaling server 20 along with a signal ground and a frame ground. Telecommunication traffic, including data, control, and signaling, is communicated to and from signaling server 20 by a main distribution frame 52. Main distribution frame 52 communicates with signaling server 20 using any of a variety of conventional telecommunications signals and protocols, including DS0A, T1 channelized, T1 ATM, T1 HDLC, E1 channelized, E1 HDLC, and OC-3c (ATM) techniques. Clock reference inputs are provided to signaling server 20 from elements within network environment 10. Signaling server may receive clock signals from such interfaces as a time of day unit 54, a composite clock unit 56, a DS1/E1 unit 58, a 5 MHz unit 60, and a 1.544/2.048 MHz unit 62. Signaling server 20 may provide clock reference outputs through a composite clock unit 64. Network elements may also interface with signaling server 20 through an Internet Protocol network 66 using a SS7/IP interface 68 and an Ethernet link 69.

Figure 2:
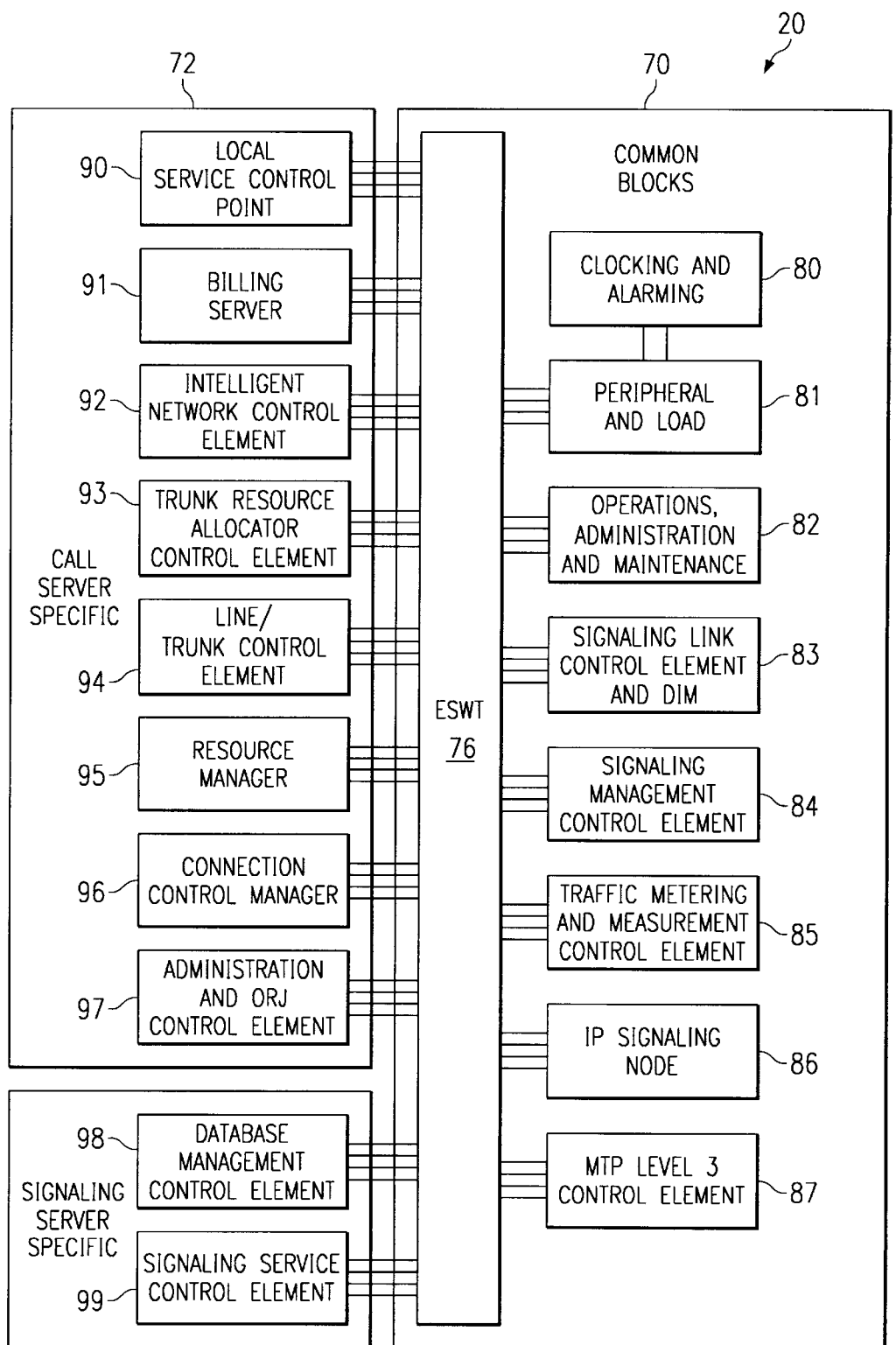
FIG. 2 illustrates a simplified block diagram of the signaling server.

FIG. 2 is a block diagram of signaling server 20. Signaling server 20 includes common functions 70, call server specific functions 72, and signaling server specific functions 74 that communicate using a local Ethernet switch 76. Common functions 70 include a clocking and alarming unit 80, a peripheral and load unit 81, an operations, administration, and maintenance (OAM) agent 82, a signaling link controller (SLC) 83, a signaling management control element (SMCE) 84, a traffic metering and measurement control element (TMMCE) 85, an Internet protocol signaling node (IPS) 86, and a message transfer part level 3 control element (L3CE) 87. Call server specific functions 72 include a local service control point (LSCP) 90, a billing server 91, an intelligent network control element (INCE) 92, a trunk resource allocator control element (TRACE) 93, a line/trunk control element (LTCE) 94, a resource manager (RM) 95, a connection control manager (CCM) 96, and an administration and operator requested job control element (ADMCE) 97. Signaling server specific functions 74 include a database management control element (DMCE) 98 and a signaling service control element (SSCE) 99.

Signaling server 20 features a distributed architecture of loosely coupled computing, or control, elements networked together via Ethernet switch 76. Each control element performs discrete functions in the control and maintenance of particular devices and in the control of signaling, administrative, or maintenance functions. Internal message processing functions are provided using high-speed Ethernet switching technologies to implement peer to peer control element communication. All control elements and peripheral equipment affecting more than one signaling link may be configured redundantly to prevent any single point failure from affecting operation of signaling server 20. Software is layered in a standard S12 organization. Applications may be standard finite message machines used throughout the S12 organization. Applications pass messages using standard S12 messaging mechanisms with such modifications as necessary to allow messages to be transmitted through Ethernet switch 76.

Figure 3:
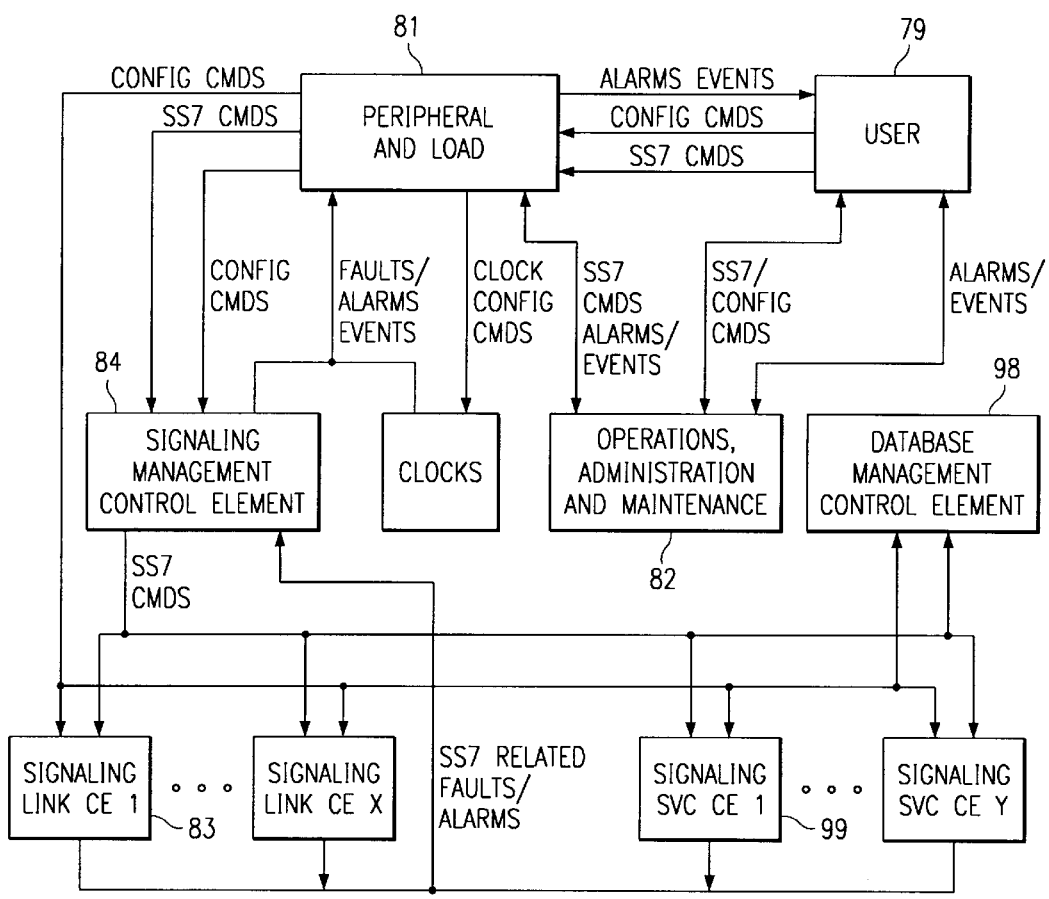
FIG. 3 shows control elements that support the SS7 subsystem and associated services for the signaling server.

FIG. 3 shows control elements that support the SS7 subsystem and associated services. These control elements include SSCE 99, DMCE 98, SLCE 83, SMCE 84, and TMMCE 85. Each control element has two, preferably 100 Megabit, Ethernet connections wherein SS7 bearer traffic is sent between control elements. Control elements may be configured as mated pairs operating in an active/standby mode or in some form of N:1 redundancy scheme. SSCEs 99 may be configured as a load shared group of simplex processors with DMCE 98 active/standby pair performing management of the SSCE 99 processor pool. SLCEs 83 are coupled via a mate link for fast fault detection and recovery. SS7 synchronization messages may be sent between SLCEs 83 over their associated mate link connection to allow SS7 link state machines to stay synchronized. Upon detection of an error on the active SLCE 83, the standby SLCE assumes responsibility for processing the SS7 traffic without having a link failure. Origination of synchronization data over the mate link connection and the detection of failures is performed by a mate link field programmable gate array (FPGA) on SLCE 83.

Peripheral and load unit 81 provides maintenance and surveillance functions of all control elements and peripheral equipment in signaling server 20. Peripheral and load unit 81 processes user commands and dispatches them to the appropriate control element, provides maintenance processing on processors and devices in signaling server 20 in order to restore and/or remove them into/from service, and receives and processes detected faults. Peripheral and load unit 81 also processes all test requests for processors and devices, handles processing events output to the user 79, processes alarms presented to the user 79, sends alarm information to customer equipment, and processes postmortem data from processor crashes. Signaling server 20 initialization is performed by peripheral and load unit 81.

OAM agent 82 is preferably a Unix based processor connected to Ethernet switch 76 and into the internal Ethernet network of signaling server 20. OAM agent 82 provides the primary OAM function for signaling server 20. OAM agent 82 is not a control element and thus is not controlled or provisioned by peripheral and load unit 81. OAM agent 82 provides graphical user interface capabilities and operation support system (OSS) services and passes information to and from peripheral and load unit 81 over Ethernet switch 76 connections. Though OAM agent 82 is the uppermost component in the logical control hierarchy for OAM, peripheral and load unit 81 is not dependent on OAM agent 82 to provide control within signaling service 20 and can initialize and control signaling server 20 independent of OAM agent 82.

Figure 4A:
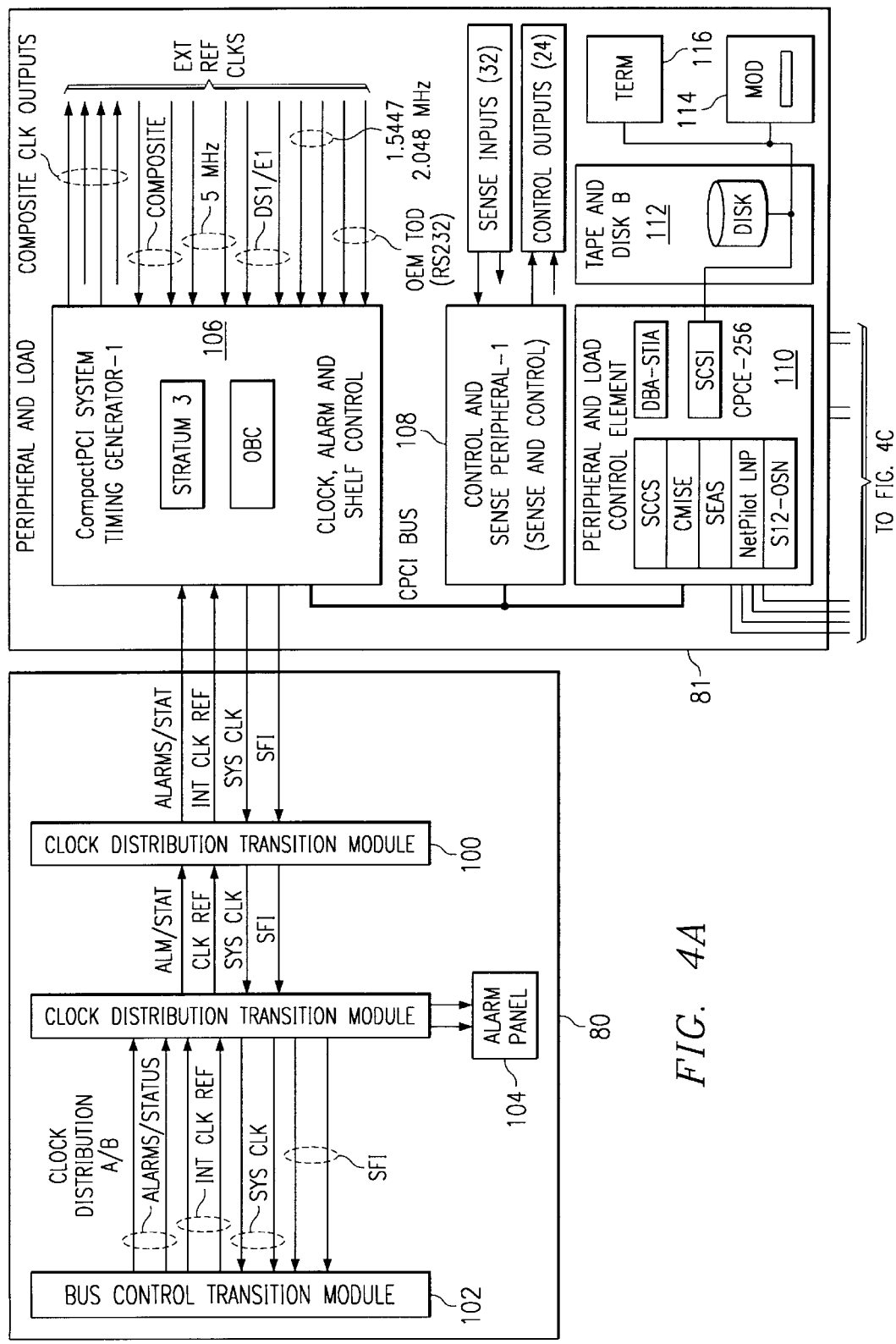
FIG. 4 illustrates a detailed block diagram of an embodiment of the signaling server.
Figure 4B:
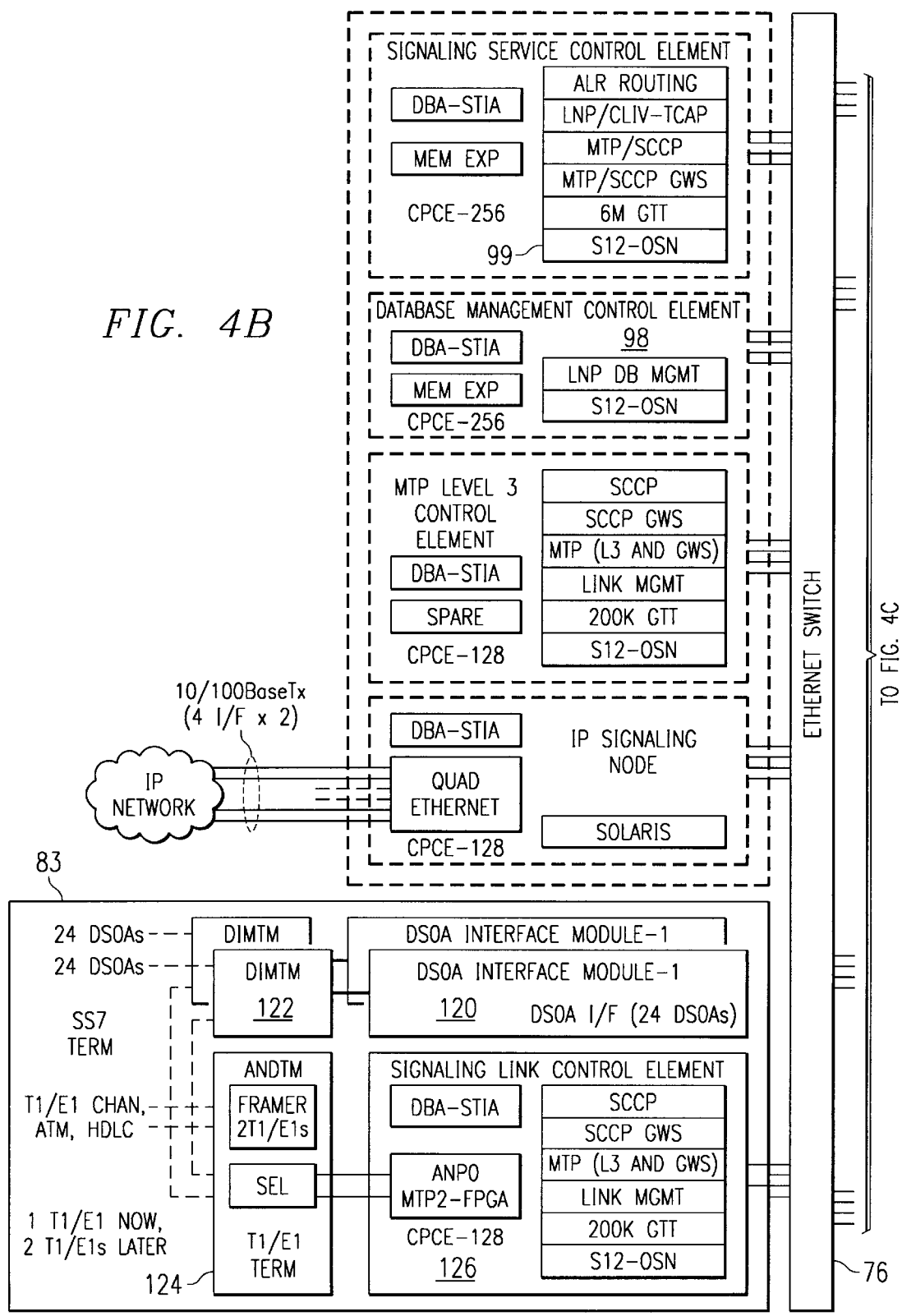
Figure 4C:
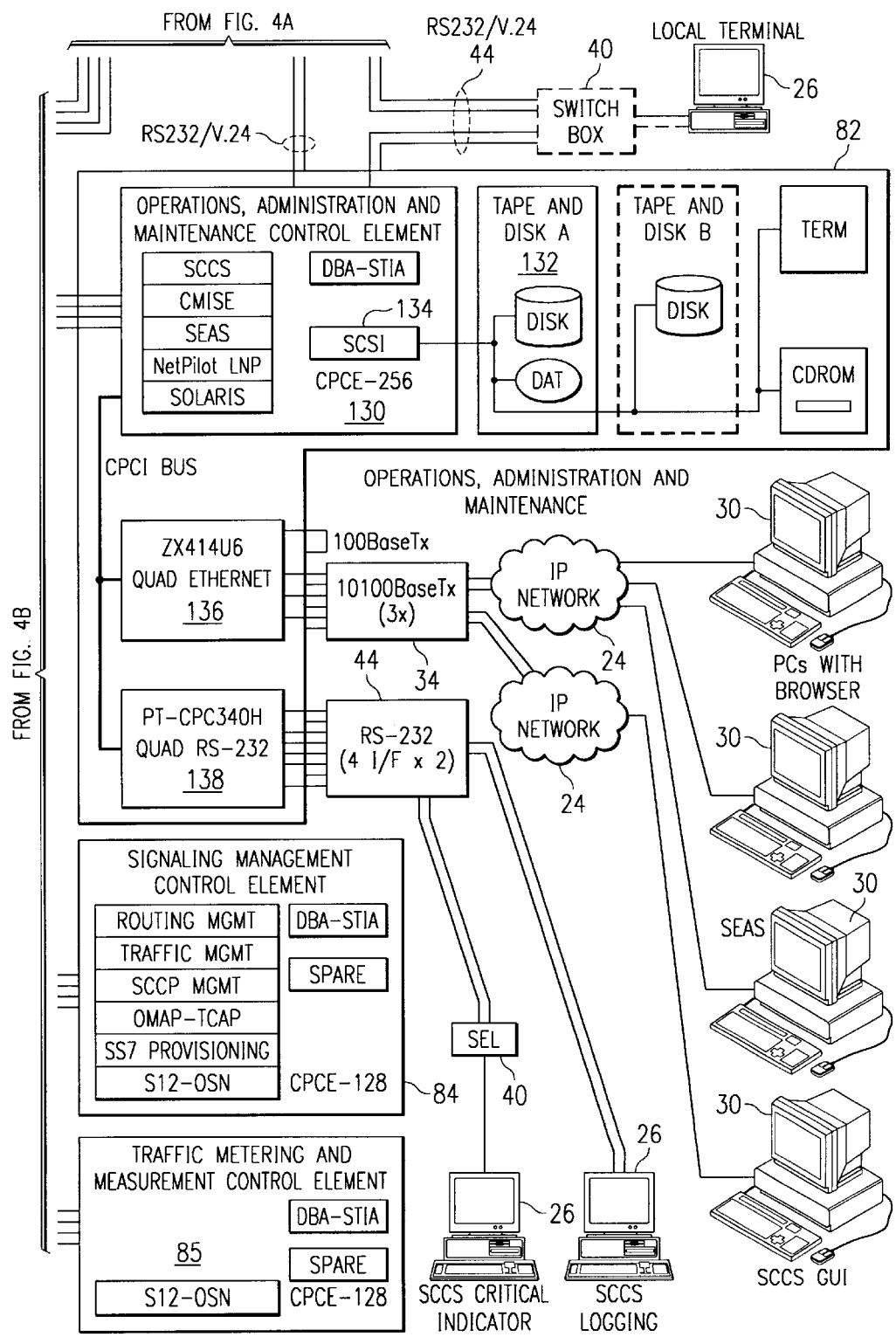

FIG. 4 is a detailed block diagram of signaling server 20. Clocking and alarming unit 80 includes a clock distribution transition module (CDTM) 100 and a bus control transition module (BCTM) 102. Clock and alarming unit 80 utilizes a multi-stage clock distribution scheme. CDTM 100 is the distribution point in the multi-stage clock distribution scheme. CDTM 100 performs clock distribution for the signaling server 20 system and frame. For one frame configurations, signaling server 20 uses a single CDTM 100 pair. For two to eight frame configurations, signaling server 20 uses two stages of CDTMs 100. For nine to ninety-six frame configurations, signaling server 20 uses three stages of CDTMs 100. CDTM 100 receives clock inputs from peripheral and load unit 81. CDTM 100 distributes copies of its output clocks and super frame indicator to the local shelf and each of the other shelves in its frame or to other frames in the system depending on signaling server 20 configuration. CDTM 100 also receives reference clock signals from each of the shelves of frames. One reference clock signal is selected and transmitted to peripheral and load unit 81. CDTM 100 also commands and controls a system alarm panel 104. CDTM 100 decodes the super frame indicator and asserts an appropriate indicator or audible output on alarm panel 104.

BCTM 102 is the third layer in the multi-stage clock distribution scheme behind peripheral and load unit 81 and CDTM 100. BCTM 102 performs clock distribution for a half shelf in a frame with each half shelf including one BCTM 102. Each BCTM 102 receives clock inputs from CDTM 100 and its mate. BCTM 102 selects one of the two inputs for distribution to each card slot in the half shelf. BCTM 102 receives a reference clock signal and alarm status from occupied card slot and selects one reference signal for transmission to CDTM 100. BCTM 102 extracts reset information from the super frame indicator and asserts or negates the corresponding card slot reset signal. BCTM 102 is the slot controller for unoccupied card slots. BCTM performs card slot activities such as bus arbitration, clock sourcing, and basic hot swap control and monitoring.

Figure 5:
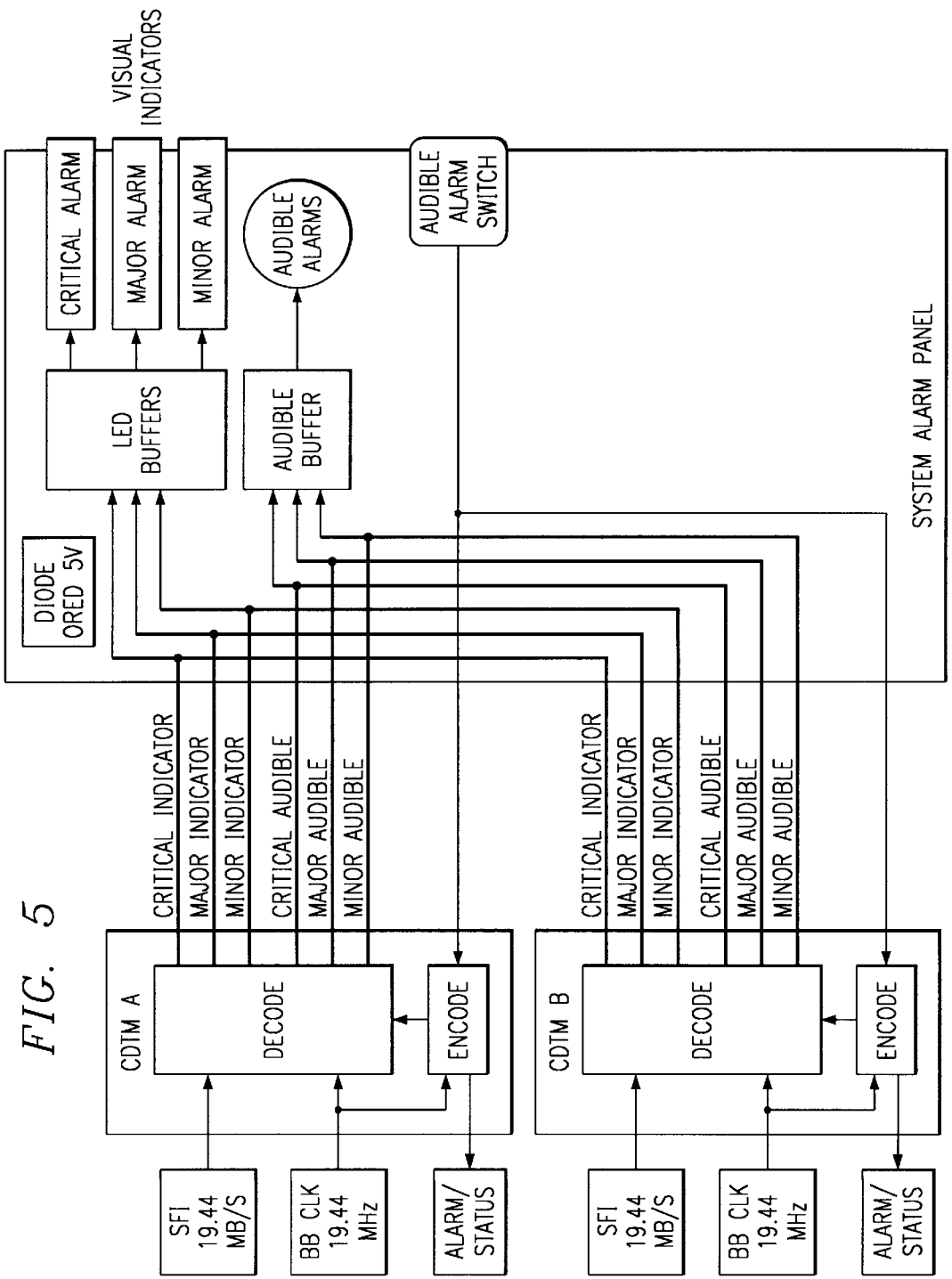
FIG. 5 shows a block diagram of alarm distribution in the signaling server.
Figure 6A:
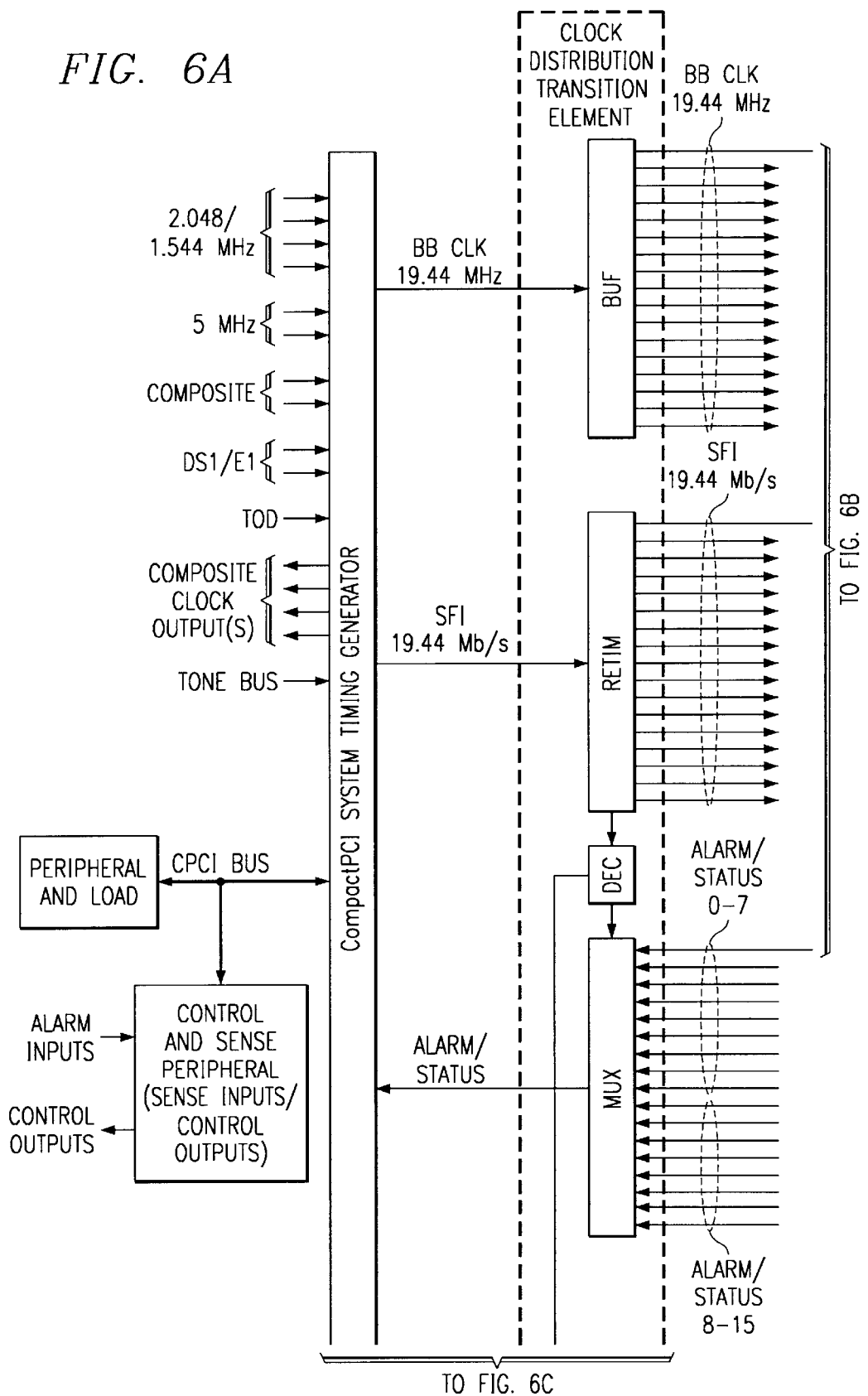
FIG. 6 shows the clock distribution in the signaling server.
Figure 6C:
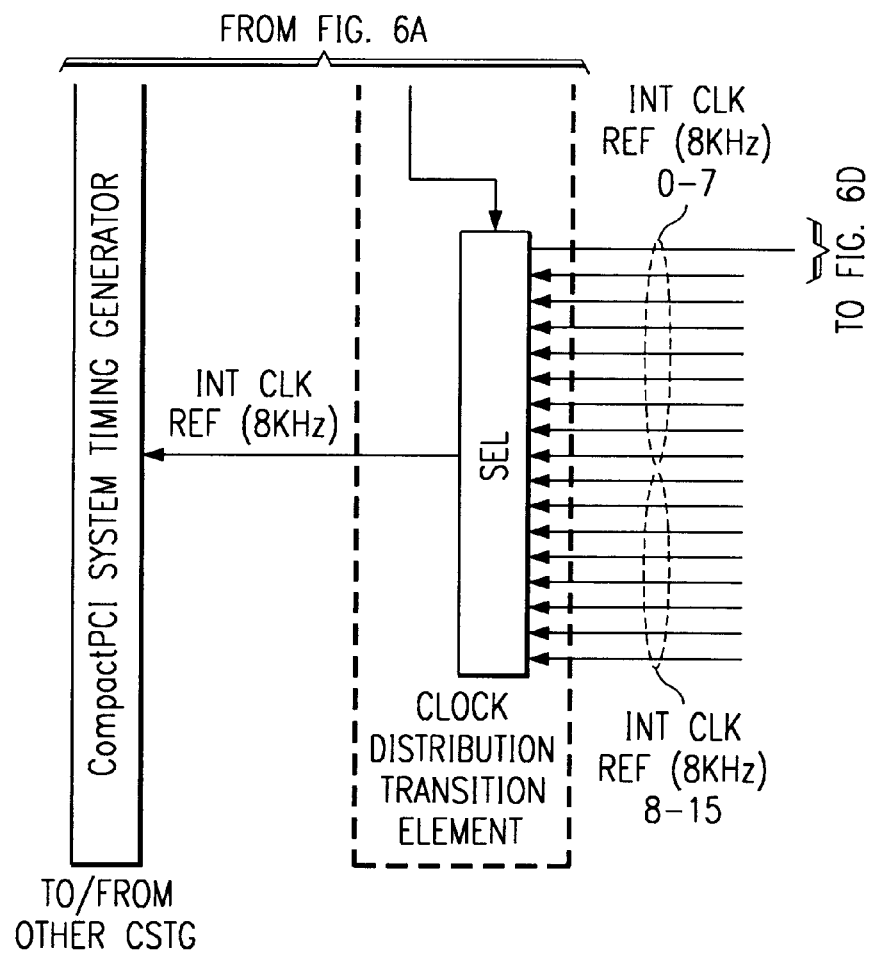
Figure 6C:
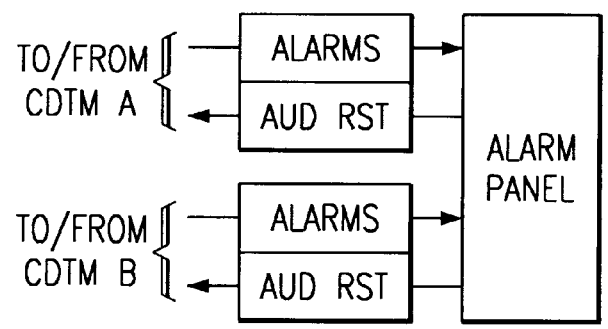
Figure 6D:
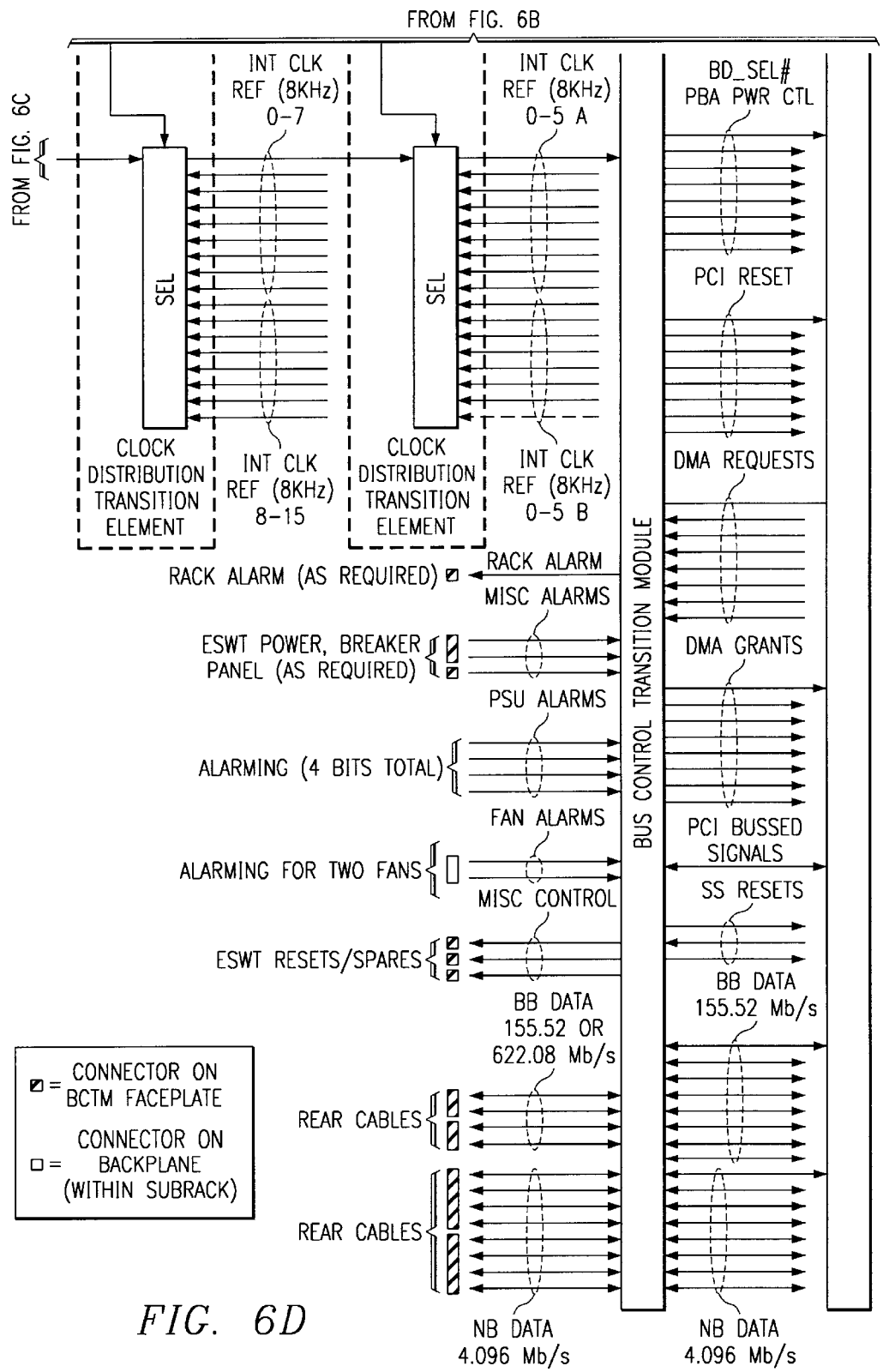

System alarm panel 104 provides critical, major, and minor visual and audible indicators for signaling server 20. System alarm panel 104 is controlled by peripheral and load unit 81 through a memory mapped input/output operation. Information is placed in the appropriate super frame indicator field and transferred to CDTMs 100. Each occupied card slot reports its health status to its corresponding BCTM 102. Each BCTM 102 reports its half shelf status to its corresponding CDTM 100. Each CDTM 100 provides its alarm status to peripheral and load unit 81. Peripheral and load unit 81 translates the alarm status information and controls system alarm functions via the memory mapped input/output operation. FIG. 5 shows a block diagram of alarm distribution for system alarm panel 104.

Peripheral and load unit 81 includes a cPCI system timing generator (CSTG) 106, a control and sense peripheral (CSP) 108, a peripheral and load control element (PLCE) 110, a tape and disk (TAD) device 112, a magnetic optical disk (MOD) device 114, and an access terminal 116. CSTG 106 is the first point in the multi-stage clock distribution scheme. CSTG 106 receives clock inputs from network interfaces 14 and generates appropriate clock outputs for signaling server 20. CSTG 106 provides clock outputs to CDTMs 100 for distribution to BCTMs 102 and individual card slots. CSTG 106 also collects system alarms and status gathered by CDTMs 100. CSP 108 provides a capability to receive and process customer alarm control points and alarm sense points. PLCE 110 controls the function of CSP 108 through memory mapped input/output register accesses. FIG. 6 shows the clock distribution in signaling server 20.

Figure 7A:
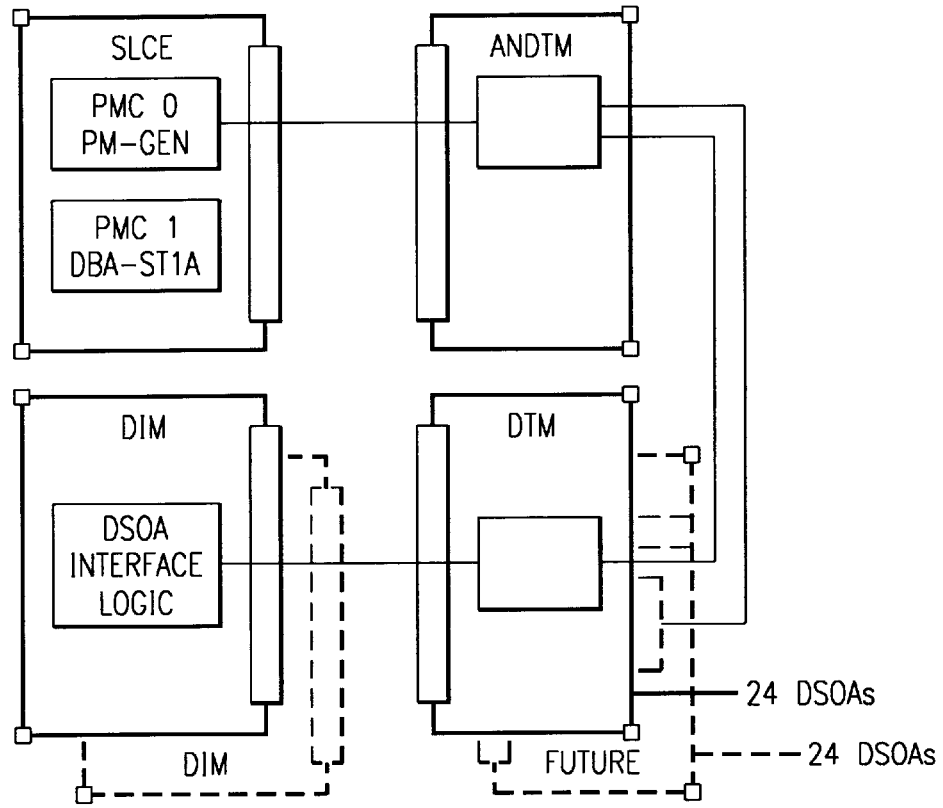
FIGS. 7A–B illustrate a physical interface for signaling links coupled to the signaling server.
Figure 7B:
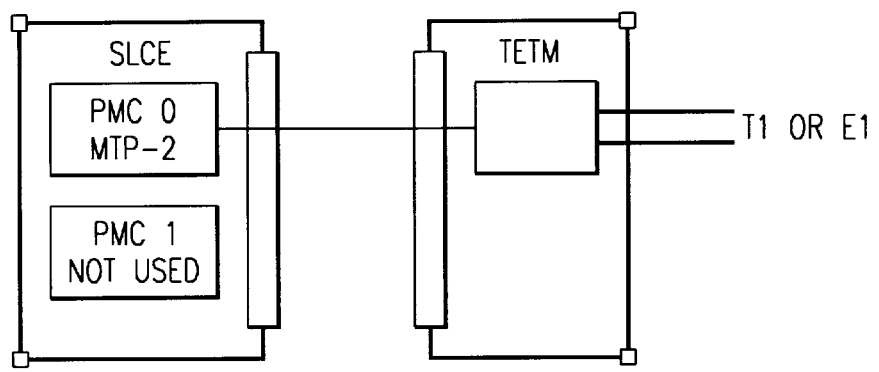

Signaling link controller 83 performs termination and generation of signaling messages for signaling server 20. Signaling link controller 83 includes the circuitry to terminate a received message signaling unit, extract the data portion of the message signaling unit, and transmit the data portion as necessary through Ethernet switch 76. Traditional STPs switch the received message in its received format and allow the message to be terminated elsewhere. Signaling link controller 83 includes a DS0A interface module (DIM) 120, a DS0A transition module (DTM) 122, an application node DS0A transition module (ANDTM) 124, and a signaling link control element (SLCE) 126. DTM 122 and DIM 120 provide the interface to preferably 24 DS0A signal lines. DTM 122 provides all connection capabilities to DIM 120 and ANDTM 124. DIM 120 multiplexes its 24 independent DS0A inputs to a 32 channel byte interleaved serial bit stream for ANDTM 124. DIM 120 receives a 32 channel byte interleaved serial bit stream from ANDTM 124 for demultiplexing back to 24 individual DS0A interfaces. ANDTM 124 provides a physical interface between DIM 120 and SLCE 126. ANDTM preferably supports two independent interfaces to DIM 120 each capable of processing a 32 channel multiplexed serial link. ANDTM 124 also provides connectorization for the mate link function and Ethernet interfaces. Signaling information may be received at ANDTM 124 directly from T1/E1 links. ANDTM 124 includes a framer to provide the interface for the T1/E1 links to SLCE 126. The physical interface for DS0A and T1/E1 are shown in FIGS. 7A and B, where TETM is a T1/E1 transition module 123. TETM provides the physical interface between two individual T1 or E1 links and a single SLCE 126.

SLCE 126 controls the signaling link, preferably SS7, hardware and supports message transfer part (MTP) levels 2 and 3, SS7 link management, signaling connection control part (SCCP) with global title translation (GTT), and gateway screening (GWS) functionality. The SS7 software architecture is split between SLCE 126, SSCEs 99, DMCE 98, and SMCE 84. Basic SS7 services, such as MTP and SCCP are performed in SLCE 126. A subset of the MTP and the SCCP layer are also present in SSCEs 99. The MTP layer provides update and message routing capabilities. The SCCP layer provides GTT and database update capabilities. SLCE 126 also performs link testing functions.

In order to preserve redundancy, all message signal units received from the external SS7 network over the DS0A or T1/E1 signaling links are provided to both a primary and redundant SLCE 126. Message signal units are fully processed by the appropriate MTP level 2 or 3 function of the active SLCE 126. The standby SLCE 126 performs MTP level 2 functions in order that the received SS7 sequence numbers are kept track in both SLCEs 126. Message signal units from other SLCEs 126, SSCEs 99, or any other device that originates SS7 messages like SMCE 84 are received by the MTP level 2 function of the both SLCEs 126 and are fully processed with the standby SLCE 126 discarding the message signal unit after processing. Periodically, link status and sequence numbers for all links of a SLCE 126 are sent from the active SLCE 126 to the standby SLCE 126. This information is sent in the smallest possible time period in order to keep the sequence numbers in unison between the mated SLCEs 126 and have the standby SLCE 126 smoothly take over in the event of a failure in the active SLCE 126.

There is a bit mapped bi-directional serial link, a mate link, connecting each SLCE 126. The mate link provides for the timely detection of failure in the active SLCE 126 in order that the standby SLCE 126 can take over operation and handling of the SS7 signaling links. Using data received over the mate link, the standby SLCE 126 uses the sequence numbers last allocated and observed by the active SLCE 126. Both active and standby SLCEs 126 are coupled to each external SS7 signaling link in order to receive and transmit signaling traffic. Transmission onto the external SS7 signaling links is performed by the active SLCE 126 as controlled by hardware drivers that allow only one SLCE to have control of the transmission side of the links at any one time.

The mate link insures that signaling links do not fail in the event of a simplex failure. Information provided across the mate link includes such items as hardware state, software state, link state, receive sequence numbers, transmit sequence numbers, and information for the standby SLCE 126 to take over handling of the appropriate link.

SSCE 99 does not control SS7 signaling related hardware but does contain logical databases and screening services for the SS7 subsystem. SSCE 99 performs application location routing (ALR), mobile number portability (MNP), local number portability (LNP) services, SCCP with GTT, GWS, and MTP buffering and routing. SSCE 99 is configured as a load share pool of control elements for SS7 message traffic processing. Signaling traffic is distributed to SCCP applications across all SSCEs 99 from the SCCP in the SLCEs 126. Once a message is processed by an SSCE 99, the message signal unit is forwarded to both SLCEs 126 associated with the output link. SSCEs 99 are managed locally within each processor in order that SCCP queries are not distributed to applications before they are ready to accept signaling traffic. When applications are ready to process signaling traffic and queries, an application status indicator is updated. Upon a change in status, the application status indicator is distributed to SLCEs 126 and SMCEs 84 so that MTP and SCCP applications therein can redistribute signaling traffic accordingly.

DMCE 98 includes the LNP/ALR database management and monitoring functions for the SSCEs 99. DMCE 98 is preferably configured as an active/standby pair of processors. DMCE 98 also maintains an overall status of applications residing on SSCEs 99. The active DMCE 98 maintains an application ready status for the SS7 applications residing in the SSCE 99 processor pool. SMCE 84 manages the SS7 signaling subsystem. SMCE 84 performs SS7 route management, traffic management, and provisioning as well as SCCP management. SMCE 84 includes all MTP network management, traffic management, and route management functions, other than response mode functions. Response mode functions, where an immediate response is required to an incoming MTP network management message, are performed locally in the SLCE 126 that supports the incoming link. SMCE 84 is the database master node for the MTP, MTP GWS, SCCP, GTT, SCCP GWS, operations/maintenance/administration part (OMAP), and transaction capabilities application part (TCAP) databases. SMCE 99 supports the local MTP routing function of SSCEs 99 and is responsible for determining the destination processor and outgoing link for all locally originated MTP management, SCCP management, and MTP routing verification test messages. SMCE 84 processes any changes in the database relations as it pertains to MTP and SCCP. SMCE 84 is the database master for MTP and SCCP relations. If verification of the change in a relation being updated is successful, the change is distributed to the control elements that contain the associated relation. The change is then written to disk. Once an update is made in SMCE 84, dynamic work tables used in the SS7 subsystem are also updated. These updates are distributed to those control elements that require updating. If an update is for a relation pertaining to a LNP/ALR application in an SSCE 99, the update is first sent to the DMCE 98 pair that is the database master for the associated relation.

MTP Level 2 routing functions support American National Standards Institute (ANSI)/Bellcore SS7 with provisions for International Telecommunications Union (ITU) and Japan standards. All aspects for MTP Level 2 peer to peer flow control using either Basic Error Correction (BER) or Preventive Cyclic Retransmission (PCR) are performed. Configuration and operation to all MTP Level 2 provisionable parameters and timers are provided. the MTP Level 2 routing function provides access to signaling link status, reports internal errors and failures, provides diagnostic capabilities for internal operation and mate link, maintains sequence numbers for transmitted and received message signal units, and transfers messages between SLCE 126 host processor and local buffers. Preferably, DS0A, T1, and E1 signaling links are supported. Generation, termination, and replication of fill-in signal units and link status signal units can be achieved. SLCE 126 includes link management software to control the signaling links. Responses and status may be forwarded to link management on SMCE 84. Link management on SLCE 126 triggers link alignment for all links under its control. The link management function waits on a message from SCCP indicating initialization is complete before starting link alignment. Link testing functions for individual SS7 signaling links is performed by the link management function of the SLCE 126.

The main MTP Level 3 routing function is performed on SLCE 126. Once MTP discrimination and distribution have determined that a message received from the MTP Level 2 routing function is for another node/point code in network environment 10, the MTP Level 3 routing function is executed. The MTP Level 3 routing function is also implemented if SCCP in SLCE 126 requires a message to be routed via a MTP signaling link, either as a result from a GTT, connection oriented services requires a message to be routed, or SCCP has received a message from a local application that requires MTP routing. The MTP Level 2 routing function is able to send messages to other SLCEs 126 as well as other links on the SLCE 126. Where MTP discrimination and distribution has determined that a received message from the MTP Level 2 routing function is for a local user part, such as SCCP, the distribution function is invoked. If the message is for SCCP, the message is sent to SCCP co-located with the MTP function. If a MTP network management message is received that requires a response mode type of response, the message is also locally processed with a response sent to the message originator. Other user parts may be located in separate processors or pools of processors. For this situation, the distribution function delivers the message to the processor or processor pool associated with that application. A subset of the MTP Level 3 routing function, buffering and routing, is located in those nodes that require messages be routed via a MTP signaling link. In this manner, any service in any application node may route messages directly through the MTP Level 2 routing function in a signaling node associated with the outgoing link. the MTP Level 3 routing function, either main or local, may accept requests to transfer messages from a local user part.

The SCCP routing function is present in both SLCE 126 and SSCE 99. If a message is destined for the local node and the message indicates it is for SCCP, the SCCP routing function is invoked. A GTT database exists in the SCCP layer of both SLCE 126 and SSCE 99 to accommodate SCCP GTT services. The GTT database supports GTT required after a LNP lookup has been performed. If SCCP routing determines that a received message is for SCCP management, the message is sent to SMCE 84 for processing. When a message that requires GTT translation is received, the message may be sent to one of the processors in the pool of SSCEs 99 and GTT is performed at the appropriate SSCE 99.

The SCCP distribution function in SLCE 126 determines if a received SCCP message is a connectionless or connection-oriented message. If the SCCP message is a connection-oriented message, the message may be discarded and an error report generated if connection-oriented services are not supported or the message may be provided to those application which support connection-oriented services for processing. If the received SCCP message is connectionless, the message is forwarded locally to the SCCP layer in SLCE 126. The SCCP layer examines the Called Party Address (CPA) in the message to determine if GTT is required. If so, GTT is performed locally or through an SSCE 99. If the message is for a local application, such as LNP services, a round robin scheme is preferably used in each SLCE 126 to distribute such messages to the pool of SSCEs 99. The message is subsequently sent to a TCAP layer of the winning SSCE 99 and then to LNP for database lookup. After database lookup, the message is sent to the SCCP layer in SSCE 99 for post LNP processing and possibly GTT. Once SCCP routing has completed, the message is returned to the local MTP routing layer in SLCE 126 for routing and then to the associated MTP Level 2 routing function for the outgoing link.

Signaling server 20 performs MTP and SCCP SEAS gateway screening in accordance with GR-82-CORE. Gateway screening is performed on those linksets marked as gateway linksets. A policing function is performed on a system basis according to ITU-T Q.705. Signaling server 20 performs two types of screening—MTP and SCCP. MTP screening is performed in SLCE 126, SSCE 99, and SMCE 84. SCCP screening is performed in SLCE 126 and SSCE 99. The MTP screening function on SLCE 126 screens all messages received on an enabled gateway link for thru-switched and terminated messages. The message passes MTP screening upon determining that it is destined for the local SCCP layer. The message then proceeds to SCCP screening. If the message requires GTT, SCCP screening is performed after GTT occurs. SCCP screening may be performed in any control element that includes the SCCP routing function. The SCCP layer in SLCE 126 may perform SCCP screening on the CPA, including the Global Title Address (GTA) field. MTP outbound screening in SLCE 126 is performed after any SCCP screening is finished. SCCP screening in SSCE 99 is performed for SCCP messages after a LNP lookup and/or a GTT has occurred. MTP outbound screening in SSCE 99 is performed after SCCP routing has been performed according to the results of the LNP lookup. SMCE 84 performs MTP outbound screening for MTP network management messages and SCCP management messages.

OAM agent 82 includes an OAM control element (OAMCE) 130, TAD A 132, external Ethernet interface 136, and RS-232 interface 138. OAM agent 82 provides a user interface to signaling server 20, supporting both local and remote access to the system. A web access capability is included to access through a web browser from a remote work station or computer. OAM agent 82 is the master of the system and provides an OAM interface to the rest of network environment 10. OAM agent 82 is the central point for management, alarm reporting, human machine interface, and OSS applications. Most of the operating system nucleus (OSN) OAM functionality is delegated to PLCE 110 to allow OSN based components to be managed in a manner more consistent with the traditional S12 system and avoid duplication of functionality between PLCE 110 and OAMCE 130.

OAM agent 82 has a full duplex redundancy configuration with both planes configured to run in an active state. This configuration permits active applications to exist on either node on an individual basis. Applications are configured to operate in an active/standby configuration so that only one instance of an application is active at any particular time. This configuration is designed to allow active applications to execute a protection switch to the standby application instance individually so that a failure of one application will nor force other unrelated applications to perform unnecessary protection switches. This configuration also results in a load sharing of application processing between the redundant OAM agents 82 without compromising application redundancy. It also removes the potential for coupling of active/standby status between unrelated applications which may depend upon different resources, such as serial and Ethernet links, which could fail on alternate planes.

OAMCE 130 preferably operates using a Solaris Operating System. OAMCE 130 provides a SEAS interface for operations staff access to signaling server 20 for administration of the SS7/C7 signaling databases and monitoring of SS7/C7 performance. The SEAS interface allows for the ability to collect traffic load data, utilization data, and performance data on all SS7/C7 components and includes data regarding gateway traffic and gateway screening rejections. The SEAS interface is the mechanism for retrieving TMM reports used to monitor the SS7/C7 components. Scheduled, autonomous, and on-demand TMM reporting are supported. TMM data is stored on TAD A 132.

OAMCE 130 includes a No. 2 Switching Control center (SCCS) to remotely monitor and control signaling server 20. This interface allows customers to manage network elements via SCCS network fault management equipment. SCCS operations staff use three types of interfaces to manage signaling server 20—access to OAM 82 graphical user interfaces, a critical indicator channel, and a logging channel. Graphical user interface provides control and maintenance access to signaling server 20. The critical indicator and logging channels provide monitoring interfaces to signaling server 20. Graphical user interfaces are preferably accessed by a web browser via an Ethernet connection. The critical indicator and logging channels are preferably asynchronous connections.

OAMCE 130 supports a local service management system (LSMS) for operations system and database administration. Configuration management/memory administration are provided. LSMS facilitates the transfer of messages and operation data to signaling server 20, in order to support local number portability. The downloaded data is used to maintain the LNP subscriber database and the LNP GTT database. Implementation of LSMS may use an Ethernet connection based on Common Management Information Service Element (CMISE). The main focus of CMISE is on a network management information base used for LNP. NetPilot is a version of LSMS.

TMMCE 85 is the central collection mechanism for all measurement data gathered in signaling server 20. TMMCE 85 includes central data collection software that periodically sends polling messages to SLCE 126. SLCEs 126 provide TMM data previously pegged. Data collected from active and not standby units is transferred to OAM agent 82. OAM agent 82 receives the TMM data and reformats it for storage on TAD A 132. After a collection period has been completed, OAM agent 82 provides a notification so that each registered data provider is notified of the end of the collection period. OAM agent 82 has the capability to retrieve TMM data and make it available to other applications.

Figure 8A:
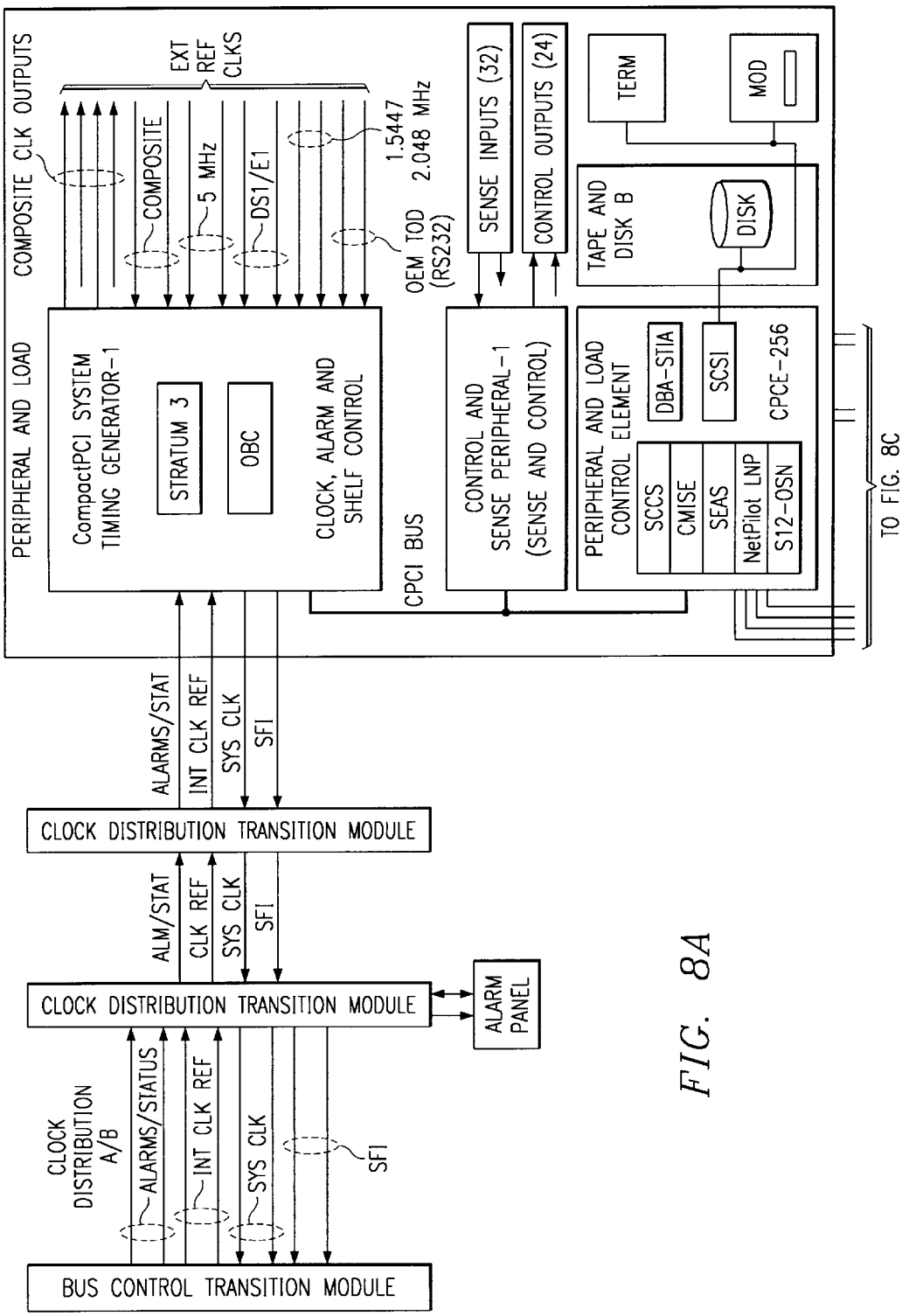
FIG. 8 illustrates a detailed block diagram of another embodiment of the signaling server.
Figure 8B:
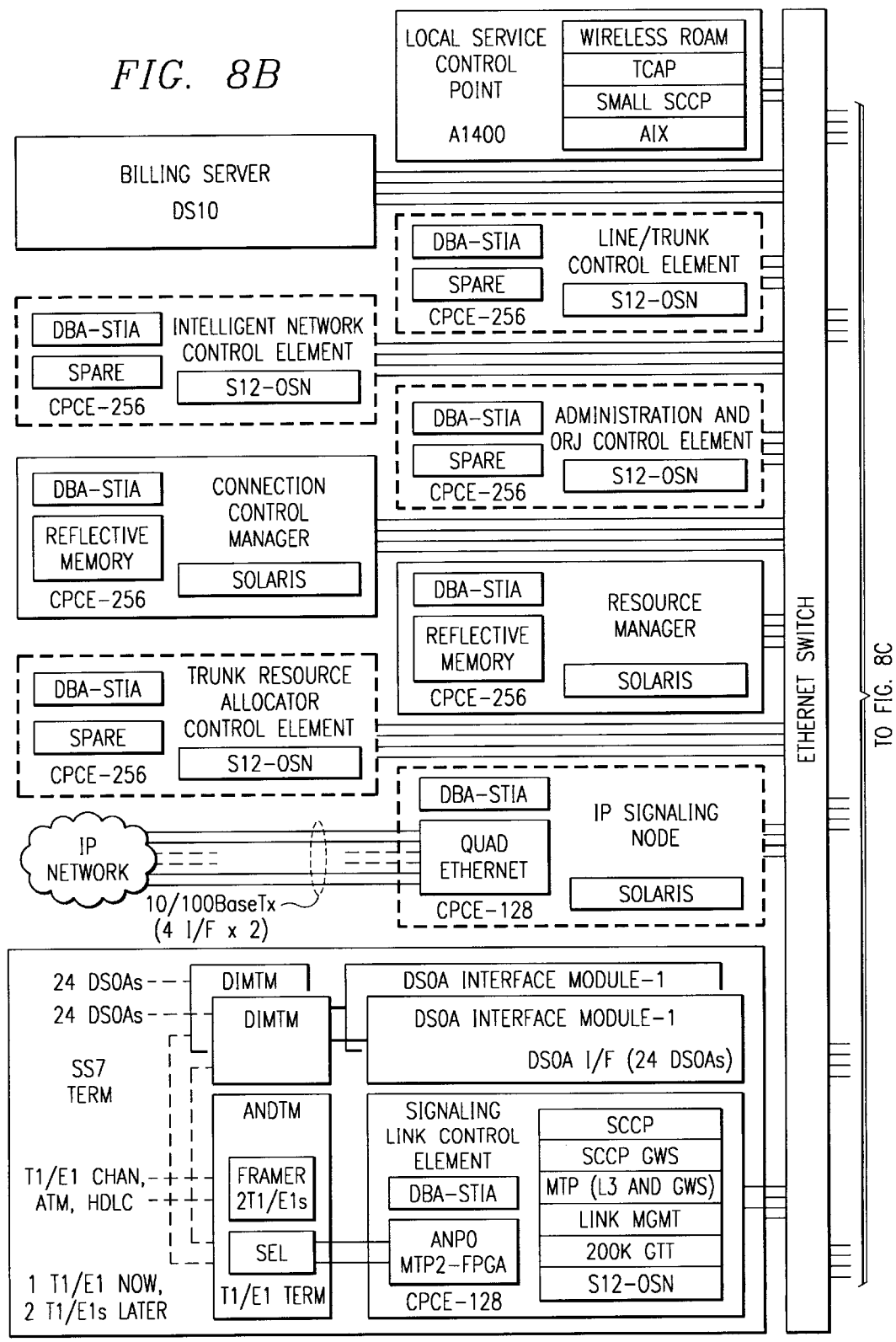
Figure 8C:
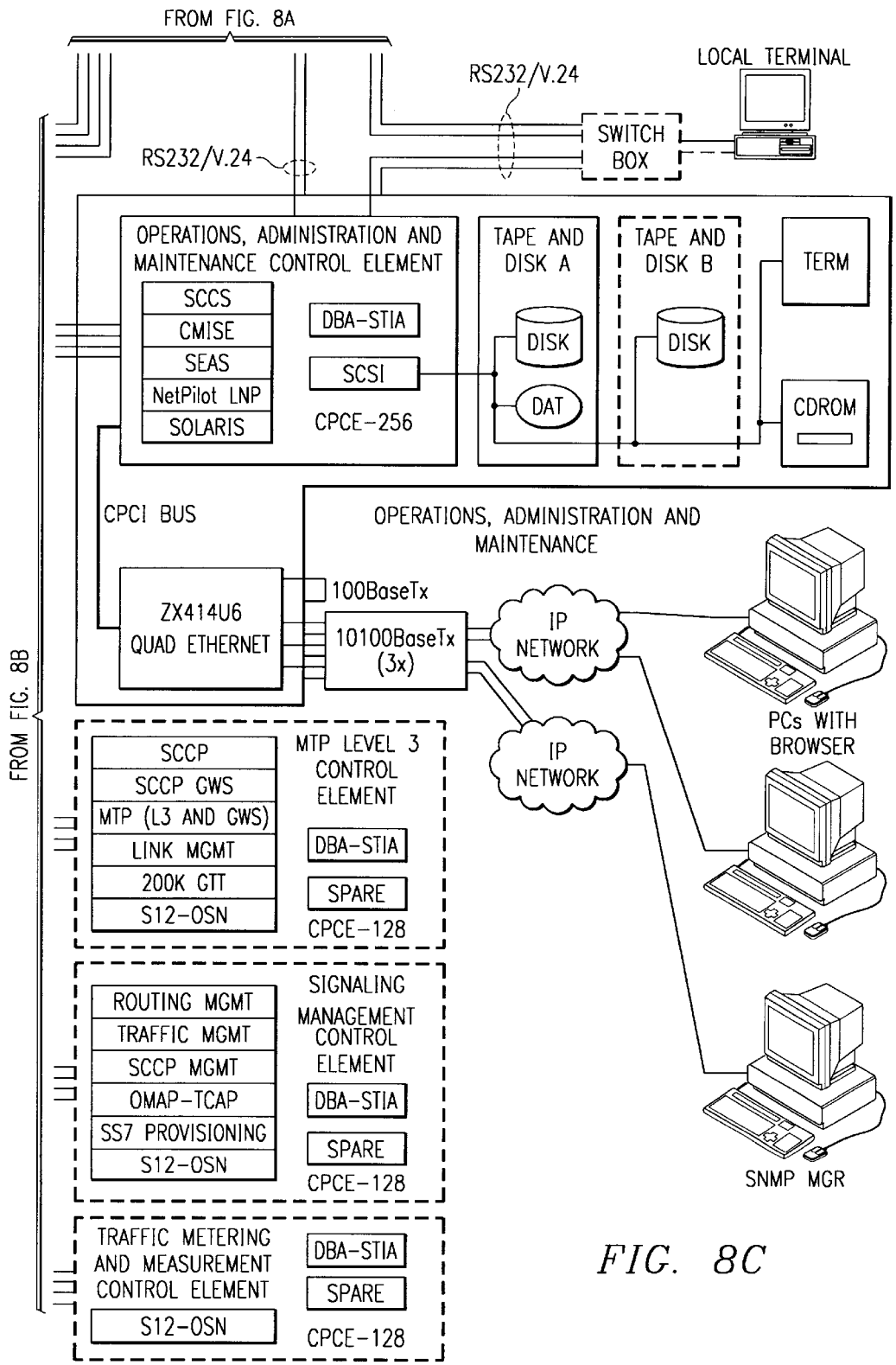

FIG. 8 shows additional details of signaling server 20 including the call server specific functions 72.

Similar to the signaling server shown in FIG. 4, some of the differences between FIG. 4 and FIG. 8 are highlighted below. A local service control point (LSCP) with wireless roam, TCAP, small SCCP, and AIX functionality is coupled to Ethernet switch 76. A line/trunk control element (LTCE) 431 is coupled to Ethernet switch 76. Also coupled to Ethernet switch 76 are an administration and ORJ (operation request job) control element (ADMCE) 432, a resource manager (RM) 433, an IP signaling node (IPS) 434, a billing server 435, an intelligent network control element (INCE) 436, a connection control manager (CCM) 437, a trunk resource allocator control element (TRACE) 438, and an MTP level 3 control element (L3CE) 439.

Figure 9B:
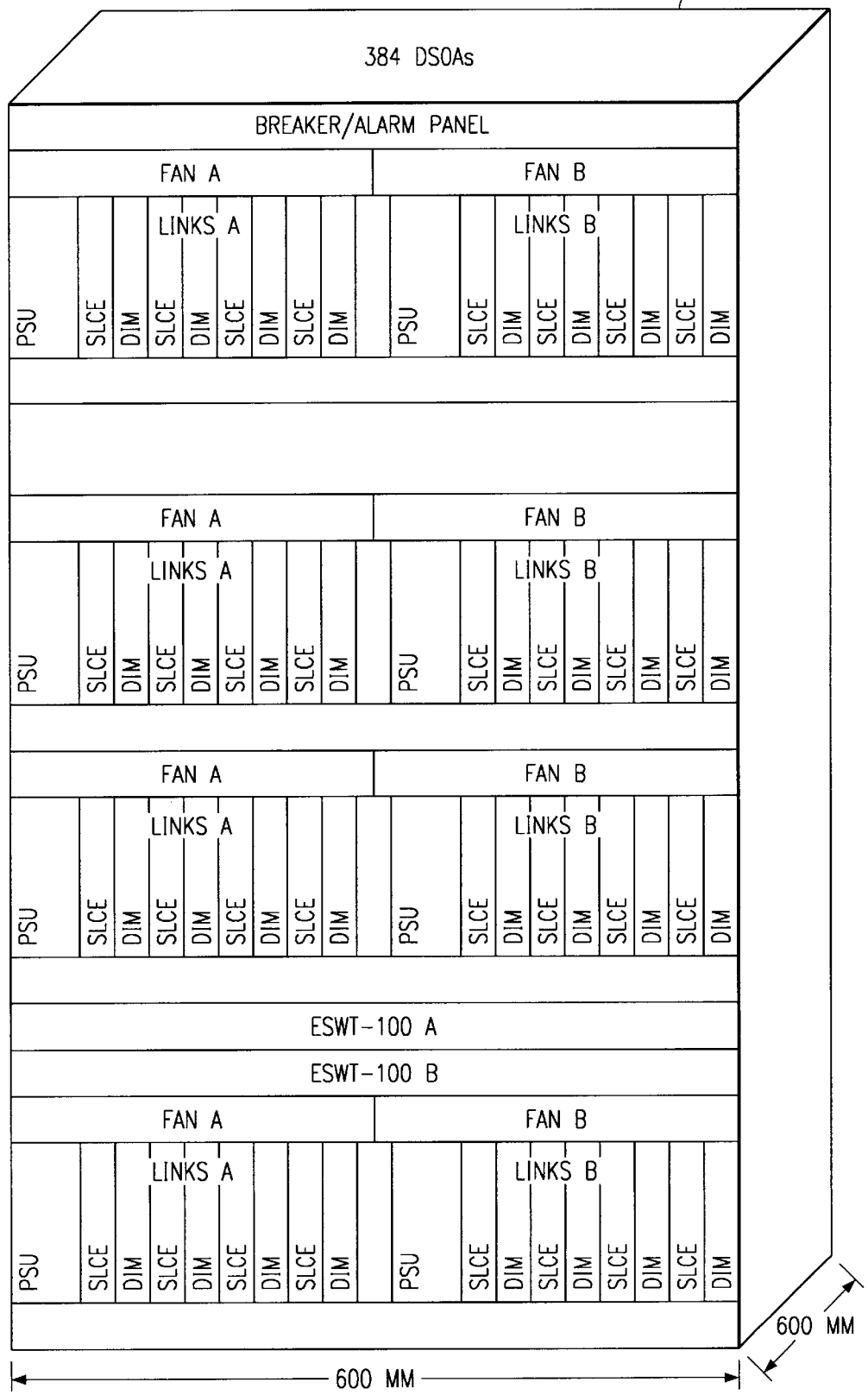
FIG. 9 illustrates a physical layout for the signaling server.
Figure 9C:
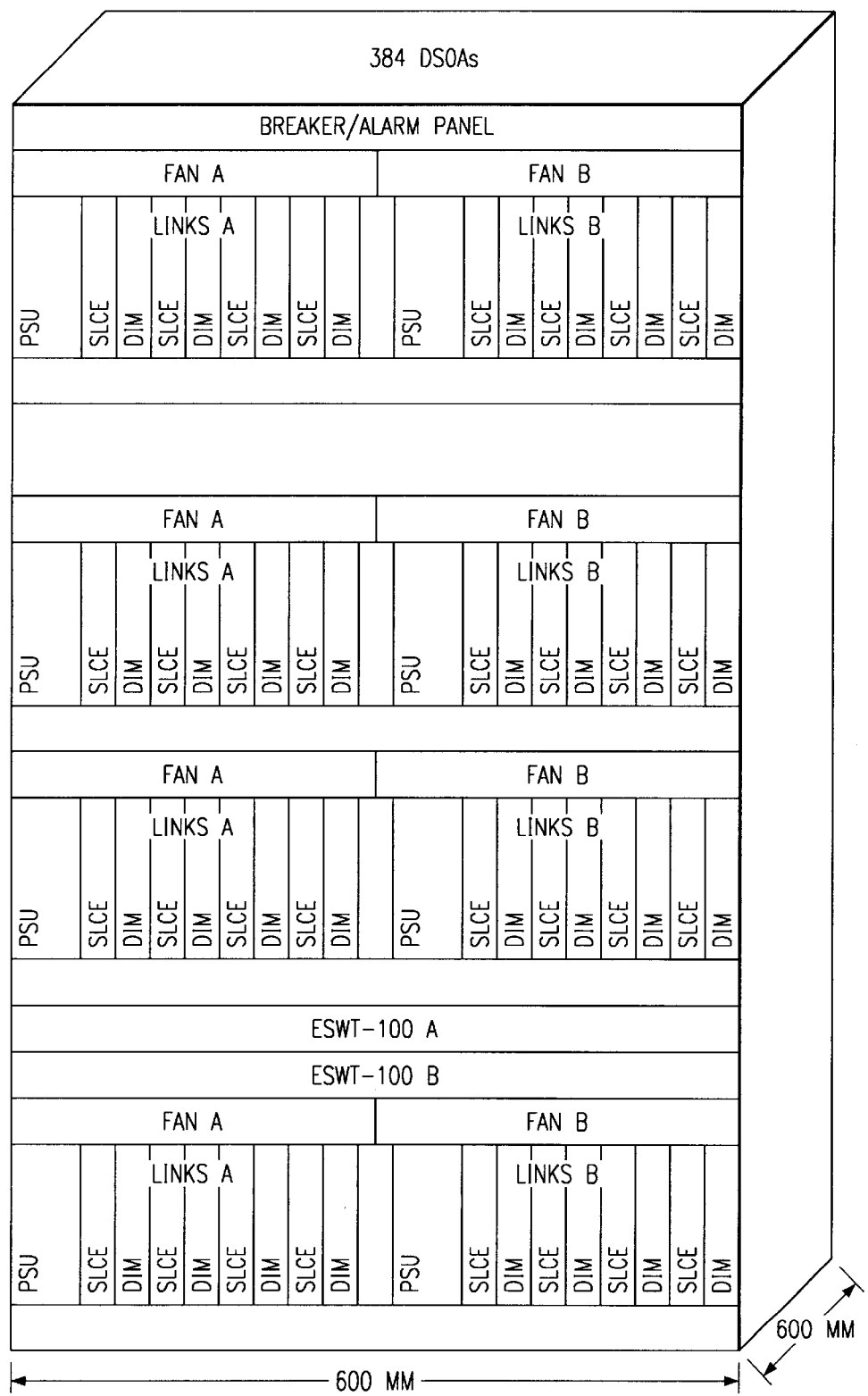

FIG. 9 shows a physical layout for signaling server 20. Signaling server 20 includes a basic rack 150 and one or more optional expansion racks 152. Basic rack 150 is partitioned into A and B redundant planes. Basic rack 150 includes A and B administration shelves 154, OAM shelves 156, and link shelves 158. A breaker/alarm panel 160 receives external power from a customer for distribution of power among the various shelves. Each half shelf in basic rack 150 includes a fan 162 to provide an internal cooling capability during operation. Storage devices MOD 27 and CDROM 29 are also provided. A plane and B plane Ethernet switches 164 and 166 provide the communication capability between each card within each shelf of basic rack 150. Expansion racks 152 include additional link shelves 158 as needed for desired signaling server 20 configuration.

Figure 10A:
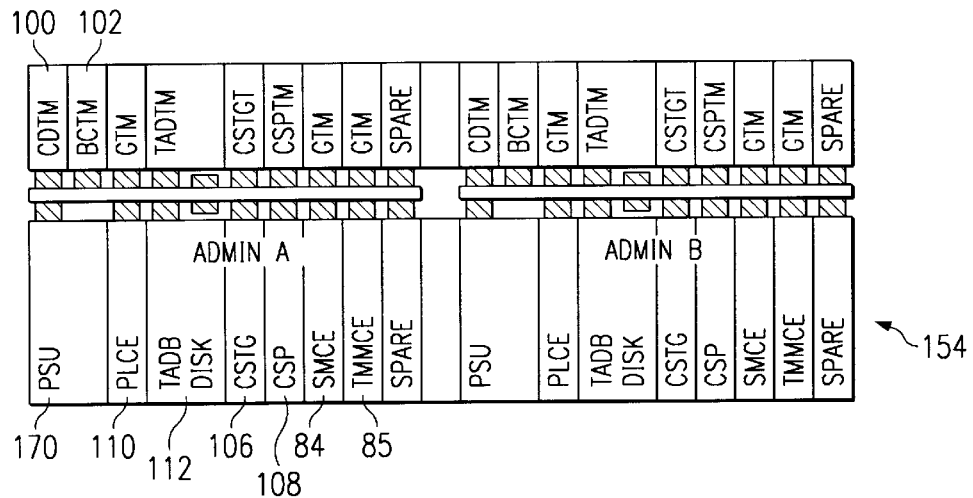
FIGS. 10A–D illustrate individual shelf configurations for the signaling server physical layout.
Figure 10B:
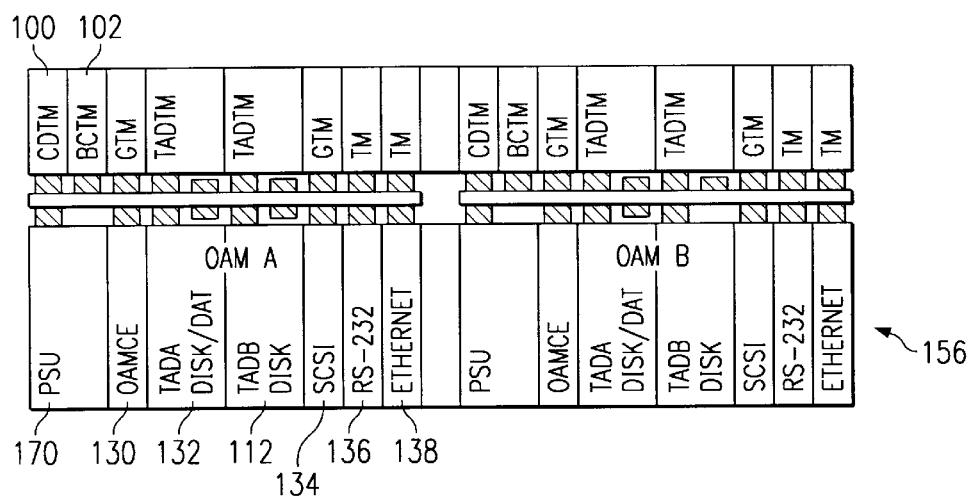
Figure 10C:
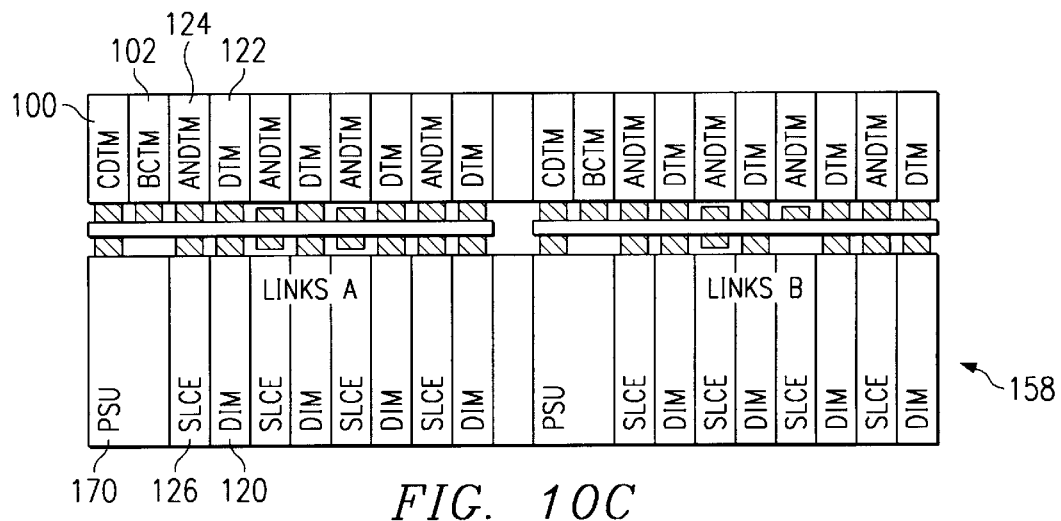
Figure 10D:
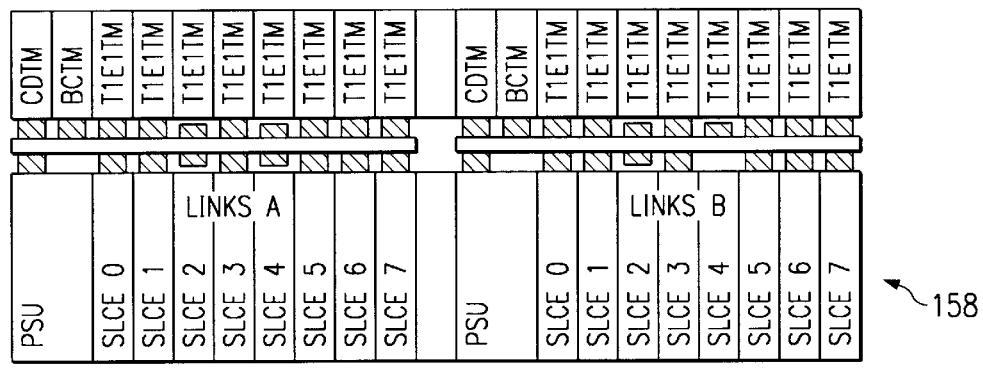

FIGS. 10A–D show individual shelf configurations for signaling server 20. In FIG. 10A, administration shelf 154 includes a power supply unit (PSU) 170, PLCE 110, TAD B 112, CSTG 106, CSP 108, SMCE 84, and TMMCE 85 as well as transition modules associated therewith. Administration shelf 154 also includes CDTM 100 and BCTM 102 to distribute timing therein. In FIG. 10B, OAM shelf 156 includes PSU 170, OAMCE 130, TAD A 132, TAD B 112, SCSI 134, RS-232 interface 136, and Ethernet interface 138 as well as associated transition modules. OAM shelf 156 also includes CDTM 100 and BCTM 102. In FIG. 10C, links shelf 158 includes PSU 170, SLCE 126, DIM 120, ANDTM 124, DTM 122, CDTM 100, and BCTM 102. FIG. 10D shows a T1/E1 configuration for link shelf 158 that uses T1/E1 transition modules 123 in place of ANDTM 124, DIM 120, and DTM 122.

As shown, subrack level equipage, as opposed to rack level equipage, is used along with front to back forced air cooling on a shelf basis. Also, compact Peripheral Component Interconnect (cPCI) form factor, backplane, and bus architecture have been implemented. The form factors defined for cPCI boards are based upon the Eurocard industry standard. cPCI supports a center backplane arrangement where printed circuit boards (PCBs) are plugged in on both sides of the backplane using the same connector. The front PCB has access to the cPCI bus and includes most of the functionality for the PCB pair. The rear PCB has limited functionality and is used to provide rear input/output access and rear EMC protection for the shelf. Signaling server 20 uses a standard depth for its front PCBs. The rear PCBs, or transition modules (TM), are the same height as the front PCBs but with half the depth.

cPCI is an adaptation of the PCI Specification for industrial and/or embedded applications requiring a more robust mechanical form factor than desktop PCI. cPCI uses industry standard mechanical components and high performance connector technologies to provide an optimized system for rugged applications. cPCI provides a system that is electrically compatible with the PCI Specification in order to allow low cost PCI components to be utilized in a mechanical form factor suited for rugged environments. Control elements are preferably standard signaling server processors utilizing mobile Pentium II processors on compact peripheral component interface (cPCI) form factor cards. Hardware for the control elements is preferably based on an industry standard PCI Mezzanine Card (PMC) that connects as a daughtercard to the cPCI carrier card. Each shelf has identical subrack designs that provides two independent 8 slot cPCI backplanes.

A cPCI system is composed of one or more cPCI bus segments. Each segment is composed of up to preferably 8 board locations. Two separate eight slot segments are used in each shelf. This split backplane configuration allows for total redundancy within each shelf. Each cPCI segment preferably includes one system slot and seven peripheral slots. The system slot board provides arbitration, clock distribution, and reset functions for all boards on the segment. The peripheral slots may include simple boards, intelligent slaves, or PCI bus masters. For link shelves 158 in signaling server 20, all slots are populated with peripheral slot cards and the system slot functionality is performed by BCTM 102. Administration shelf 154 and OAM shelf 156 may house a system slot card or utilize the same concept as link shelf 158.

Figure 11A:
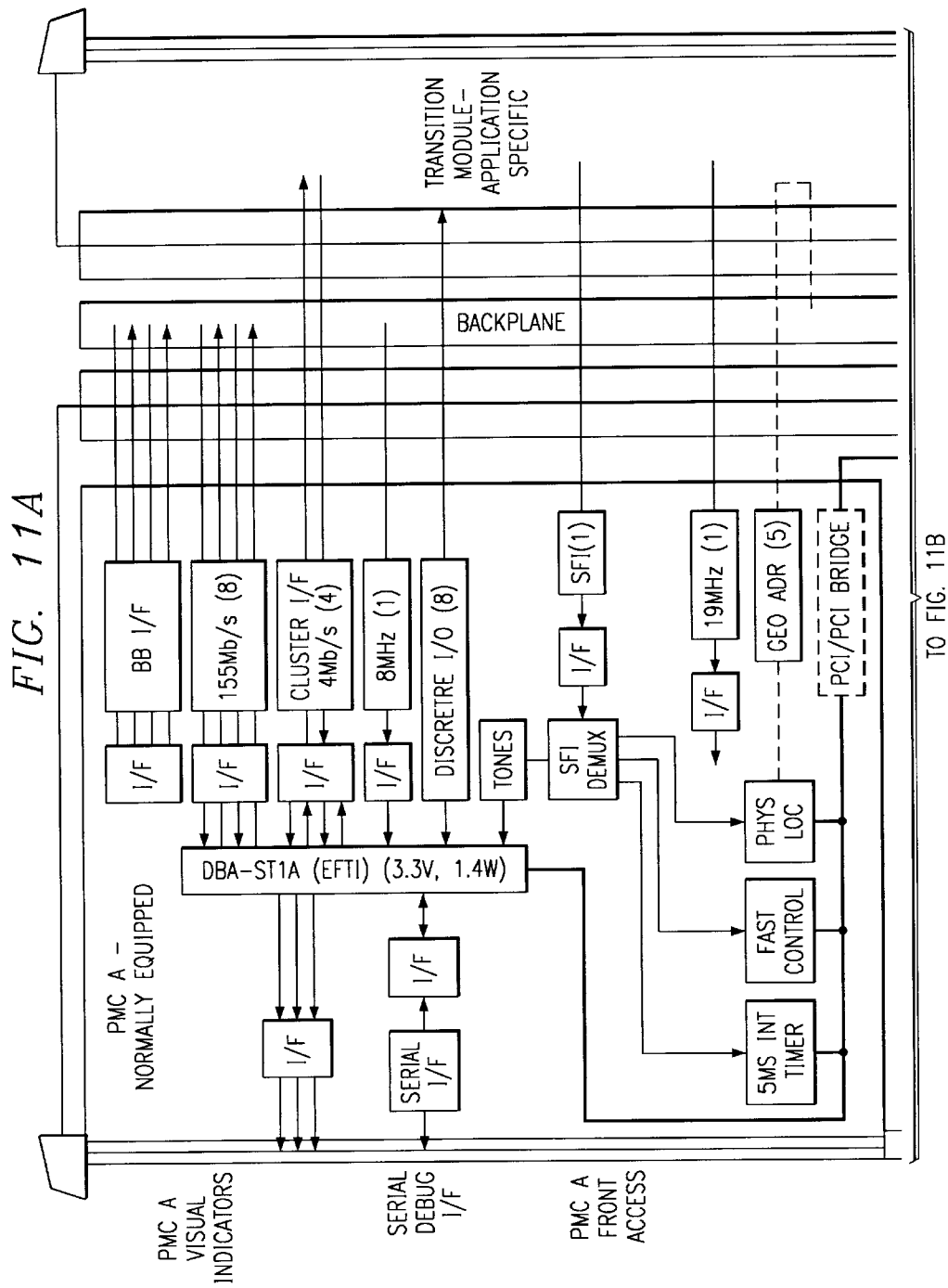
FIG. 11 illustrates an example of a card layouts for each shelf.
Figure 11B:
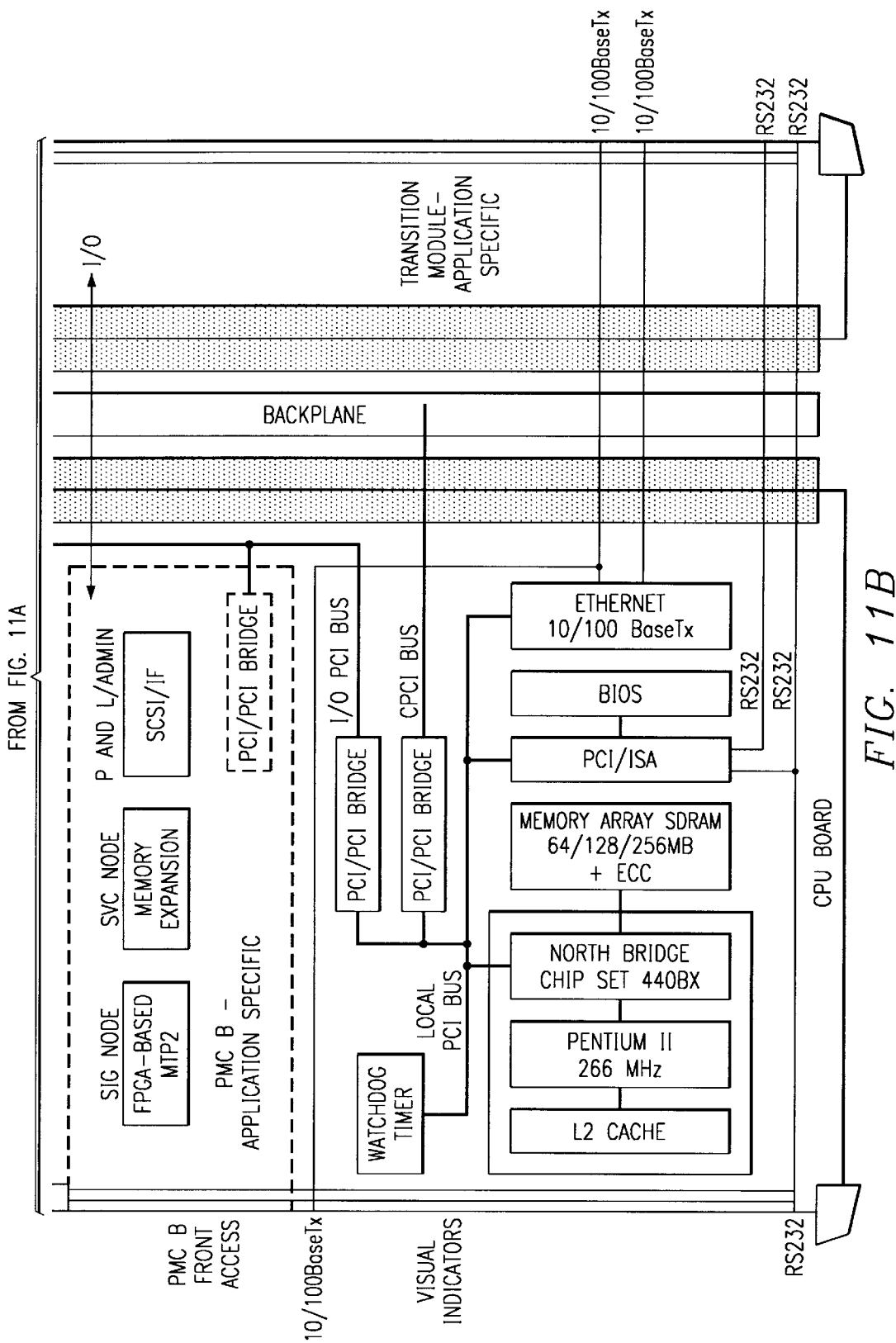

A cPCI control element (CPCE) is the basic processor platform for signaling server 20. FIG. 11 shows an example CPCE 200. The CPCE includes a base board 202 and preferably two PMCs 204 and 206. All CPCEs include the S12 operating system and S12 applications. A common control element software interface is provided as a shielding layer to hide the hardware differences with existing S12 processor boards. An extended function terminal interface circuit is used to provide necessary timers needed by the S12 operating system. An extension for the standard BIOS functions is provided. The CPCE base board 202 includes a processor core, dynamic random access memory, non-volatile memory, and a series of user interfaces. The CPCE base board performs as a non-system slot controller and complies with basic hot swap specifications. Application specific hardware 208 resides on the PMC slots to provide the CPCE with the capability to perform predefined signaling server 20 operations. Application specific hardware may include a plurality of functional capabilities. The CPCE selects the appropriate functionality for the situation at hand.

More information with respect to individual circuits and functions within signal server 20 can be found in co-pending U.S. application Ser. Nos. 09/539,919, 09/539,920, 09/540,591, 09/540,594, 09/541,123, 09/541,386, 09/541,389, and 09/541,408, which are incorporated by reference herein.

Thus, it is apparent that there has been provided in accordance with the present invention, a signaling server that satisfies the advantages set forth above, Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method of processing signaling information in a telecommunications network, comprising:

receiving signaling information from a signaling link;

extracting a data portion of the signaling information;

selecting one of a plurality of signaling services control elements in a round-robin fashion to perform further processing on the extracted data portion; and routing the extracted data portion over an Ethernet switch for further processing.

2. The method of claim 1, further comprising:

performing message transfer part level two processing on the extracted data portion.

3. The method of claim 2, further comprising:

performing signaling connection control part processing on the extracted data portion.

4. The method of claim 2, further comprising:

determining that the signaling information is for another node;

performing message transport part level three processing on the extracted data portion.

5. The method of claim 3, further comprising:

performing a local number portability query on the extracted data portion.

6. The method of claim 5, further comprising:

performing a global title translation process on the extracted data portion.

7. The method of claim 3, further comprising:

determining whether the data portion is connectionless or connection-oriented.

8. The method of claim 7, further comprising:

discarding the extracted data portion in response to a connection-oriented determination.

9. The method of claim 1, further comprising:

generating a return message in response to the processing.

* * * * *